United States Patent

Arima et al.

[11] Patent Number: 5,826,086
[45] Date of Patent: Oct. 20, 1998

[54] DEVICE AND METHOD FOR AIDING DESIGNING PROCESS OF SOFTWARE DEVELOPMENT

[75] Inventors: Yasuhiko Arima, Sapporo; Yoshio Nishiyama, Kawasaki; Itaru Fukao, Kawasaki; Hiroaki Abe, Kawasaki; Yuji Kubota, Sapporo, all of Japan

[73] Assignee: Fujitsu Limited, Kanagawa, Japan

[21] Appl. No.: 550,074

[22] Filed: Oct. 30, 1995

[30] Foreign Application Priority Data

Mar. 17, 1995 [JP] Japan .................................. 7-059399

[51] Int. Cl.⁶ ...................................... G06F 9/44
[52] U.S. Cl. ........................................ 395/701; 395/967
[58] Field of Search ...................... 395/701, 792, 395/967, 702

[56] References Cited

U.S. PATENT DOCUMENTS 4,802,116  1/1989  Ward et al. ............................ 364/900
5,572,733  11/1996  Ryu et al. ............................. 395/701

FOREIGN PATENT DOCUMENTS 0475135  3/1992  Japan .................................. G06F 9/06

Primary Examiner—James P. Trammell
Assistant Examiner—Kakali Chaki
Attorney, Agent, or Firm—Helfgott & Karas, P.C.

[57] ABSTRACT

A device for aiding a software designing process in which software is divided into a plurality of tasks includes a dynamic-specification-information editing unit for defining dynamic behaviors between the tasks to create a dynamic specification, a static-specification-information editing unit for defining static configurations between the tasks to create a static specification, and an editing-unit-coordination controlling unit for coordinating operations of the dynamic-specification-information editing unit and the static-specification-information editing unit.

17 Claims, 22 Drawing Sheets

| INTER-SUBSYSTEM I/F | DATE OF CREATION | 94/01/01 | CREATED BY | | DEPARTMENT | |
|---|---|---|---|---|---|---|
| | DATE OF UPDATE | | MODIFIED BY | | VERSION | V01L01 |

NAME OF SUBSYSTEM    MONITORING AND CONTROLLING DEVICE

SUBSYSTEM AT THE OTHER END : MAIN CONTROL UNIT

| INTER-SUBSYSTEM DATA NAME | MEANING | IN OR OUT |
|---|---|---|
| REQUEST FOR BOOTING | REQUEST FOR SUBSYSTEM BOOTING | ■ IN  ☐ OUT |
| MPU NOTIFICATION OF RECEIVING | FRAME FROM MPU | |
| NOTIFICATION OF END OF BOOTING | NOTIFICATION OF END BOOTING | |
| ⋮ | ⋮ | |

LIST OF TASKS

SELECT TASK TO BE ARRANGED IN INTER-TASK SEQUENCE

■ MPU COMMUNICATION
■ MPSC COMMUNICATION
■ STATUS CONTROL
☐ WDT
⋮

■ OK    ☐ CANCEL

⇩    D

| INTER-TASK SEQUENCE | DATE OF CREATION | 94/01/01 | CREATED BY | | DEPARTMENT | |
|---|---|---|---|---|---|---|
| | DATE OF UPDATE | | MODIFIED BY | | VERSION | V01L01 |

NAME OF SUBSYSTEM    MONITORING AND CONTROLLING DEVICE        NAME OF SEQUENCE

| TASK | | TASK | | TASK | |
|---|---|---|---|---|---|
| MPSC COMMUNICATION | | STATUS CONTROL | | MPU COMMUNICATION | |

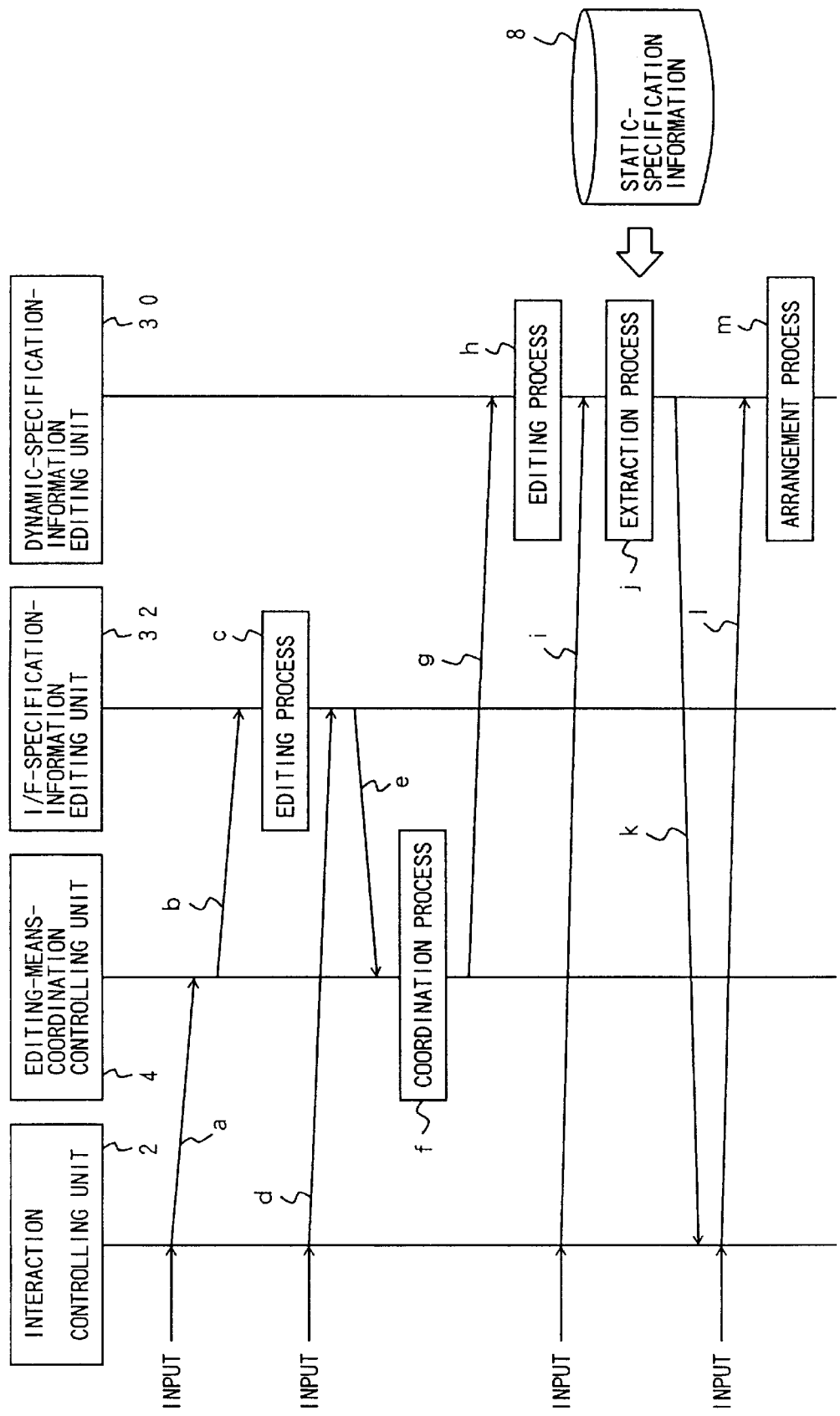

FIG. 19
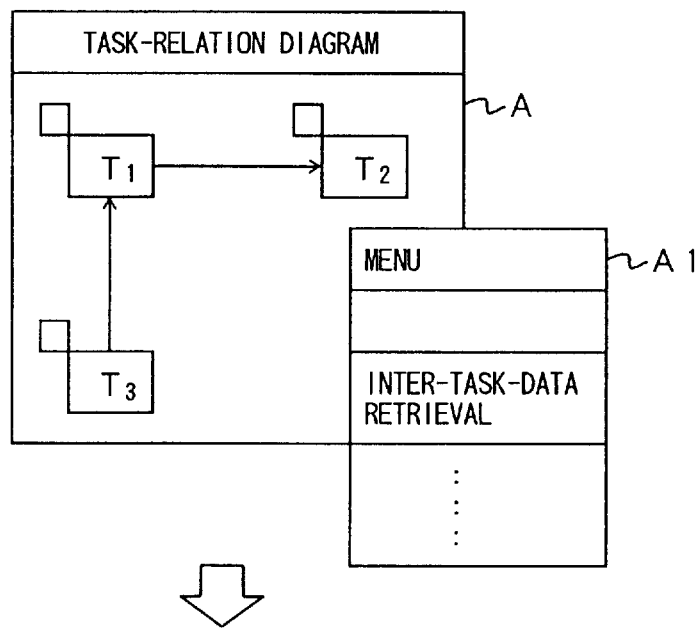
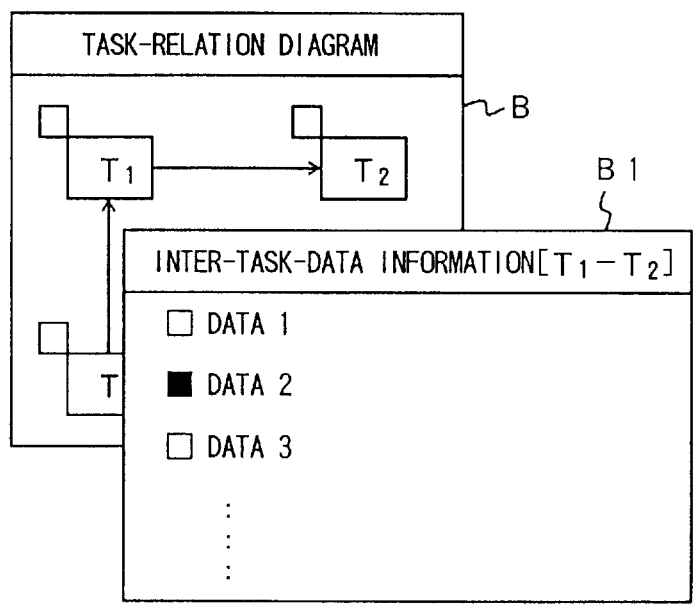

DEVICE AND METHOD FOR AIDING DESIGNING PROCESS OF SOFTWARE DEVELOPMENT

BACKGROUND OF THE INVENTION

1. Field of the Invention

The present invention generally relates to software-design aiding devices and methods for aiding designing processes of software development, and particularly relates to a software-design aiding device and a method for aiding a task division of the designing processes.

2. Description of the Related Art

A rapid development of information and communication systems in recent years has resulted in an increasing demand for an improvement in a quality of software products and for an efficiency in software development. As more efforts are directed to meeting this demand, the use of software-design aiding devices is increasing. Advantages of the use of the software-design aiding devices includes a facilitation of standardization through an exclusion of individuality by providing standard formats, template figure components, etc. Thus, misunderstandings between readers and writers of design specifications can be decreased.

In a task-division process of software designing, expressions used in specifications tend to be vague, and means for editing the specifications are not standardized. Thus, it is difficult to make and standardize software products such that they can be treated as reusable components. This raises an expectation for an improvement.

In general, a designing process in the software development is established despite minor differences.

In creating software for a real-time system, a plurality of functional elements which are required for an operation of the system are first identified, and, then, an operation of each of these elements is defined. In this case, these functional elements are called a static configuration, and relations in operations between these elements are called a dynamic behavior. The word "task" is used for referring to units of software which can operate in real-time and in parallel.

In order to define the division of tasks at the stage of the task-division process, the above two viewpoints, i.e., the static configuration and the dynamic behavior, are required. These two viewpoints are not independent of each other. That is, when the static configuration is changed, the dynamic behavior is changed also, and vice versa. In this manner, the tasks are defined by determining these two viewpoints back and forth.

In practice, the division of tasks is carried out by generating design documents such as definitions of communication means, a task-relation diagram, an inter-task sequence diagram, and an inter-task flowchart. Here, the definitions of communication means defines communication mechanisms (means) between divided tasks. The task-relation diagram describes relations between the tasks in terms of accesses to the data which is shared by the tasks. The inter-task sequence diagram represents a time sequence which describes data processing and data flows between divided tasks with regard to input/output data of subsystems of a designing target (the word "subsystem" refers to a CPU). The inter-task flowchart defines communication buffers and the like between the divided tasks.

Various editing means such as editors are provided in the related art, and are used for generating these design documents.

As described above, the designing process in software development is established, in which such processes as a determination of the dynamic behavior and a determination of the static configuration are defined. In this case, types of the documents generated during the designing process, types of designing components, and a description of relations between these components vary from project to project, depending on each designer's philosophy. That is, these factors tend to be unique for each project.

Since the design documents are not produced in a harmonized manner, those who are not involved in the generation of these documents may not be able to understand these documents. This is particularly true when as much information as possible, including static and dynamic relations of tasks, is described in one document. This kind of problem is also observed in the use of aiding tools, because there is no aiding tool which supports software development by giving separate descriptions for the static configuration and the dynamic behavior.

As a scheme for obviating this problem, the object modeling technique is attracting an attention. In this technique, an object model, a dynamic model, and a functional model are used for modeling an object world in order to analyze, design, and manufacture software products. The object model of this technique is equivalent to the definition of the static configuration, so that it can be said that an aiding tool using this technique provides separate descriptions for a static specification and a dynamic specification. However, the object modeling technique employs models which belong to a logical world, so that architectures (task programs) must be assigned after the modeling of objects. These divided models are not created by taking into consideration a physical subsystem and task programs (architectures). Thus, it is difficult for the object modeling technique to express the static specification and the dynamic specification when dividing tasks of the subsystem by taking into account the architectures.

Accordingly, there is a need in the field of software development for a software-design aiding device which can support a task-division process at the designing stage of the software development by clarifying specification expressions in the task-division process and by providing separate editing means related with each other.

Also, there is a need for a software-design aiding device which can enhance a reusable feature of the design documents by providing as products of the task-division process the design documents having less variation in their expressions.

SUMMARY OF THE INVENTION

Accordingly, it is a general object of the present invention to provide a software-design aiding device which can satisfy the needs described above.

Also, it is another and more specific object of the present invention to provide a software-design aiding device which can support a task-division process at the designing stage of the software development by clarifying specification expressions in the task-division process and by providing separate editing means working in cooperation with each other.

In order to achieve the above objects according to the present invention, a device for aiding a software designing process in which software is divided into a plurality of tasks includes a dynamic-specification-information editing unit for defining dynamic behaviors between the tasks to create a dynamic specification, a static-specification-information editing unit for defining static configurations between the tasks to create a static specification, and an editing-unit-coordination controlling unit for coordinating operations of the dynamic-specification-information editing unit and the static-specification-information editing unit.

According to the present invention, the editing units for separately expressing the dynamic specification information and the static specification information are provided in the software-design aiding device for use in the task-division process. Also, these two editing units can be coordinated with each other.

It is yet another object of the present invention to provide a software-design aiding device which can enhance a reusable feature of the design documents by providing as products of the task-division process the design documents having less variation in their expressions.

In order to achieve the above objects according to the present invention, the device described above further includes a display, an input unit for receiving an input from a user, a dynamic-specification-design-component storage unit for storing dynamic-specification-design components used in the dynamic specification, a dynamic/static-specification-design component storage unit for storing shared-specification-design components used in both the dynamic specification and the static specification, and a dynamic-specification-information-format storage unit for storing a format of the dynamic specification, wherein the dynamic-specification-information editing unit displays on the display by using the format a first document region in which the dynamic-specification-design components and the shared-specification-design components selected through the input unit are arranged to create the dynamic specification, and displays on the display a template region, from which the dynamic-specification-design components and the shared-specification-design components are selected through the input unit so as to be arranged in the first document region. Also, the device includes a static-specification-design-component storage unit for storing static-specification-design components used in the static specification, and a static-specification-information-format storage unit for storing a format of the static specification, wherein the static-specification-information editing unit displays on the display by using the format a document region in which the static-specification-design components and the shared-specification-design components selected through the input unit are arranged to create the static specification, and displays on the display a template region, from which the static-specification-design components and the shared-specification-design components are selected through the input unit so as to be arranged in the document region.

Accordingly, the design documents created as products of the task-division process have less variation in their expressions. As a result, discrepancies between the writers and the readers of these documents with regard to the understandings of the documents are reduced, so that the reliability of the design documents is enhanced. Also, harmonization between the specifications is achieved, so that the reusability of program assets is enhanced.

Other objects and further features of the present invention will be apparent from the following detailed description when read in conjunction with the accompanying drawings.

BRIEF DESCRIPTION OF THE DRAWINGS

FIG. 16 is an illustrative drawing showing another display image when the forth activation sequence of FIG. 14 is used as a design aiding tool;

FIG. 17 is a timing chart of a fifth activation sequence according to the embodiment of the present invention;

FIG. 19 is an illustrative drawing showing an example of a display image when the activation sequence of FIG. 18 is used as a design aiding tool;

DESCRIPTION OF THE PREFERRED EMBODIMENTS

In the following, a principle and an embodiment of the present invention will be described with reference to accompanying drawings.

Figure 1:
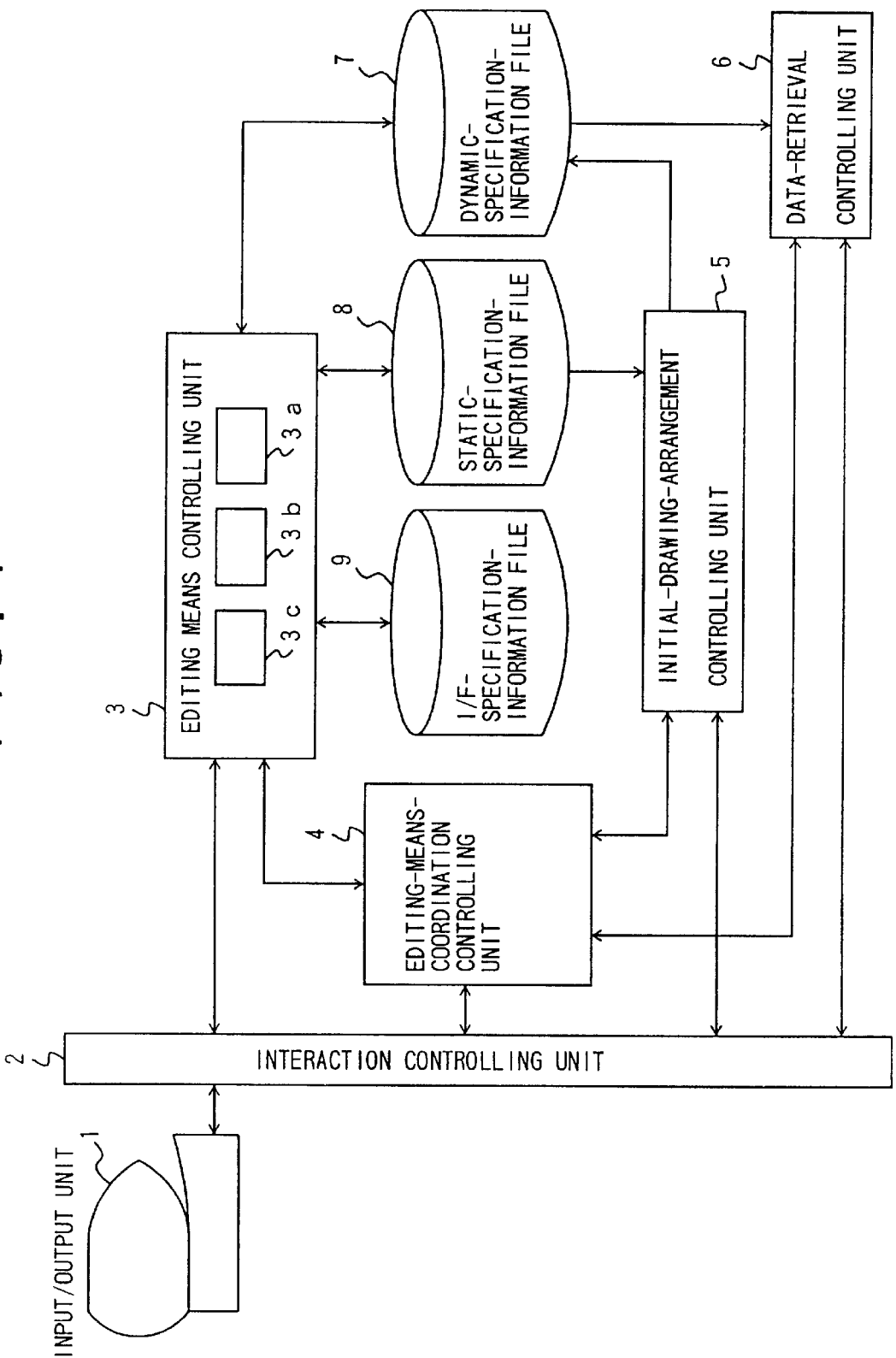
FIG. 1 is a block diagram of a software-design aiding device according to a principle of the present invention.
Figure 2:
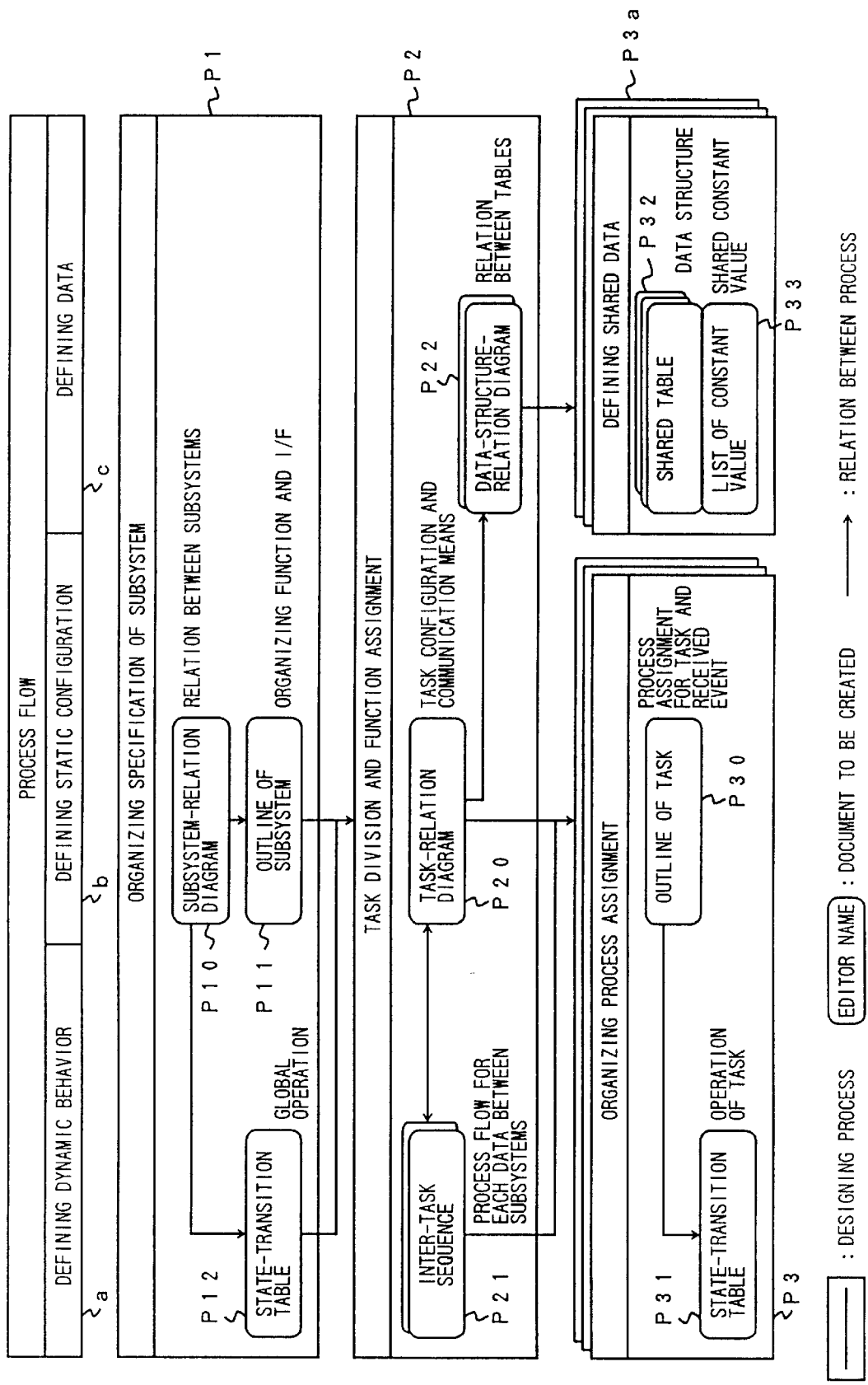
FIG. 2 is an illustrative diagram of process flows of a task-division process according to a principle of the present invention.

FIG. 1 is a block diagram of a software-design aiding device according to a principle of the present invention. FIG. 2 is an illustrative diagram of process flows of a task-division process according to a principle of the present invention.

In FIG. 1, the software-design aiding device includes an input/output unit 1, an interaction controlling unit 2, an editing-means controlling unit 3, an editing-means-coordination controlling unit 4, a initial-drawing-arrangement controlling unit 5, a data-retrieval controlling unit 6, a dynamic-specification-information file 7, a static specification-information file 8, and an I/F-specification-information file 9.

The input/output unit 1 is operated by a designer. The interaction controlling unit 2 provides an interactive communication which allows the designer to activate various editing means, carry out a retrieval of inter-task data, etc. The editing-means controlling unit 3 includes editing means 3a through 3c which are used for expressing specifications of the dynamic behavior and the static configuration. The editing means 3a is used for editing the dynamic specification, the editing means 3b is used for editing the static specification, and the editing means 3c is used for editing I/F (interface) between subsystems. The editing-means-coordination controlling unit 4 controls coordination between each of the editing means 3a through 3c as well as coordination between the editing means 3a through 3c and either one of the initial-drawing-arrangement controlling unit 5 or the data-retrieval controlling unit 6. The initial-drawing-arrangement controlling unit 5 determines an initial arrangement of static information which is indicated by the designer in the dynamic-specification-information file 7. The data-retrieval controlling unit 6 retrieves inter-task data indicated in the dynamic-specification-information file 7, and, also, identifies the dynamic-specification-information file 7 which includes given inter-task data. The dynamic-specification-information file 7, the static specification-information file 8, and the I/F-specification-information file 9 are files which store each of specification information.

The process flow of the task-division process shown in FIG. 2 includes three processes P1 through P3, wherein the process P1 is a process for organizing specifications of the subsystems (unit:CPU), the process P2 is a process for task division and function assignment, and the process P3 is a process for organizing process assignment of each task module and defining shared data. Each of the processes P1 through P3 is divided into three processes a, b, and c for defining the dynamic behavior of design targets, defining the static configuration of the design targets, and defining data handled by the design targets, respectively.

In the principle of the present invention, two separate specification expressions, i.e., a definition of the dynamic behavior and a definition of the static configuration, are provided in the task-division process. Also, a coordination between these two separate specification expressions is provided to unify roles of the design documents, so that misunderstandings between a writer of the documents and a reader of the documents can be dissipated.

With reference to FIG. 2, a basic process flow of the design process according to the principle of the present invention will be described. FIG. 2 shows an example of a design process of communication software used for switchboards and the like. The process flow moves from the process P1 for organizing specifications of the subsystems, to the process P2 for a task division and a function assignment, and to the process P3 for organizing the process assignment of each task.

In the process P1 for organizing the specifications of the subsystems, editing means P10 for editing a subsystem-relation diagram is used for defining relationships between a plurality of the subsystems, which relationships are provided as the static configuration of the design targets. Then, editing means P11 for editing an outline of the subsystems is used for organizing a function of each subsystem and external I/Fs as the static configuration. Also, editing means P12 for editing a state-transition table is used for defining a global operation of the subsystems with regard to the relationships of the subsystems.

In the process P2 for the task division and the function assignment, editing means P20 for editing a task-relation diagram is used for defining task configurations and communication means (mechanisms) in order to define the static configuration. Then, editing means P22 for editing a data-structure-relation diagram is used for defining relationships between tables by using data relating to the task-relation diagram. Also, the editing means P21 for editing an inter-task sequence is used for generating a process flow for each data between the subsystems as the dynamic behavior of the design targets.

In the process P3 for organizing the process assignment of each task, editing means P30 for editing an outline of the tasks is used for defining the process assignments for the tasks and received events as the static configuration. Then, editing means P31 for editing the state-transition table is used for defining operations of the tasks as the dynamic behavior. Also, editing means P32 for editing a shared table and the like is used for obtaining a shared-data structure by defining shared data based on the data-structure-relation diagram obtained at the process P2. Furthermore, editing means P33 for editing a list of constant values is used for defining shared constant values.

In this manner, each of the processes P1 through P3 includes the process a for defining the dynamic behavior of the design targets and the process b for defining the static configuration. Each of the processes a and b is provided with a corresponding one of the editing means, which are coordinated to aid the task-division process.

The software-design aiding device of FIG. 1 implements the process P2 for the task division and the function assignments of FIG. 2.

When the designer gives an instruction through the input/output unit 1 to activate the editing means 3a through 3c or to initiate a retrieval of the inter-task data, the interaction controlling unit 2 starts an operation. Then, the interaction controlling unit 2 controls the editing-means controlling unit 3 to activate one of the editing means 3a for editing the dynamic behavior, the editing means 3b for editing the static configuration, and the editing means 3c for editing the I/F between the subsystems.

When the designer requests an editing of the I/F between the subsystems by operating on the input/output unit 1, the editing-means-coordination controlling unit 4 controls the editing-means controlling unit 3 to activate the editing means 3c for editing the I/F between the subsystems. The I/F between the subsystems includes data called events or triggers. When this data is described in detail, this data relates to an inter-task sequence. When the designer selects an inter-task sequence through the input/output unit 1 during the operation of the editing means 3c, the editing-means-coordination controlling unit 4 recognizes a request for the selection of the inter-task sequence. Then, the editing-means-coordination controlling unit 4 activates the editing means 3a, thus allowing the designer to edit the dynamic specification information.

The editing means 3b for editing the static specification and the editing means 3a for editing the dynamic specification stores a result of the designing in the static specification-information file 8 and the dynamic-specification-information file 7, respectively. Also, specification information which has been previously generated can be extracted and updated. The editing-means-coordination controlling unit 4 provides a coordination between the editing means 3b for editing the static specification and the editing means 3a for editing the dynamic specification so as to support the task-division process.

In using the editing means 3a for editing the dynamic specification, components to be used in the dynamic specification are prepared in advance as components of the static configuration. Thus, when the editing means 3a is activated, the initial-drawing-arrangement controlling unit 5 extracts each component from the static specification-information file 8, and displays a drawing of each component on the input/output unit 1.

Also, design components including those components which are shared between the static specification information and the dynamic specification information can be stored in advance in the static specification-information file 8 as template drawings. When the editing unit 3b for editing the static configuration is activated, these template drawings are displayed on the input/output unit 1 via the interaction controlling unit 2. Then, one of these drawings is selected to carry out a designing process including the task division. Components which are selected at this stage for editing the static configuration include components which are required for determining the static configuration, and components which coexist with dynamic components.

Also, the editing unit 3a is used for editing the dynamic configuration by using the dynamic design components and design components shared between the dynamic design and the static design. The data-retrieval controlling unit 6 is used when the editing unit 3a edits the dynamic specification, and controls a search in the dynamic specification information for data which is exchanged between arranged tasks.

In the following, an embodiment of the present invention will be described with reference to the accompanying drawings.

Figure 3:
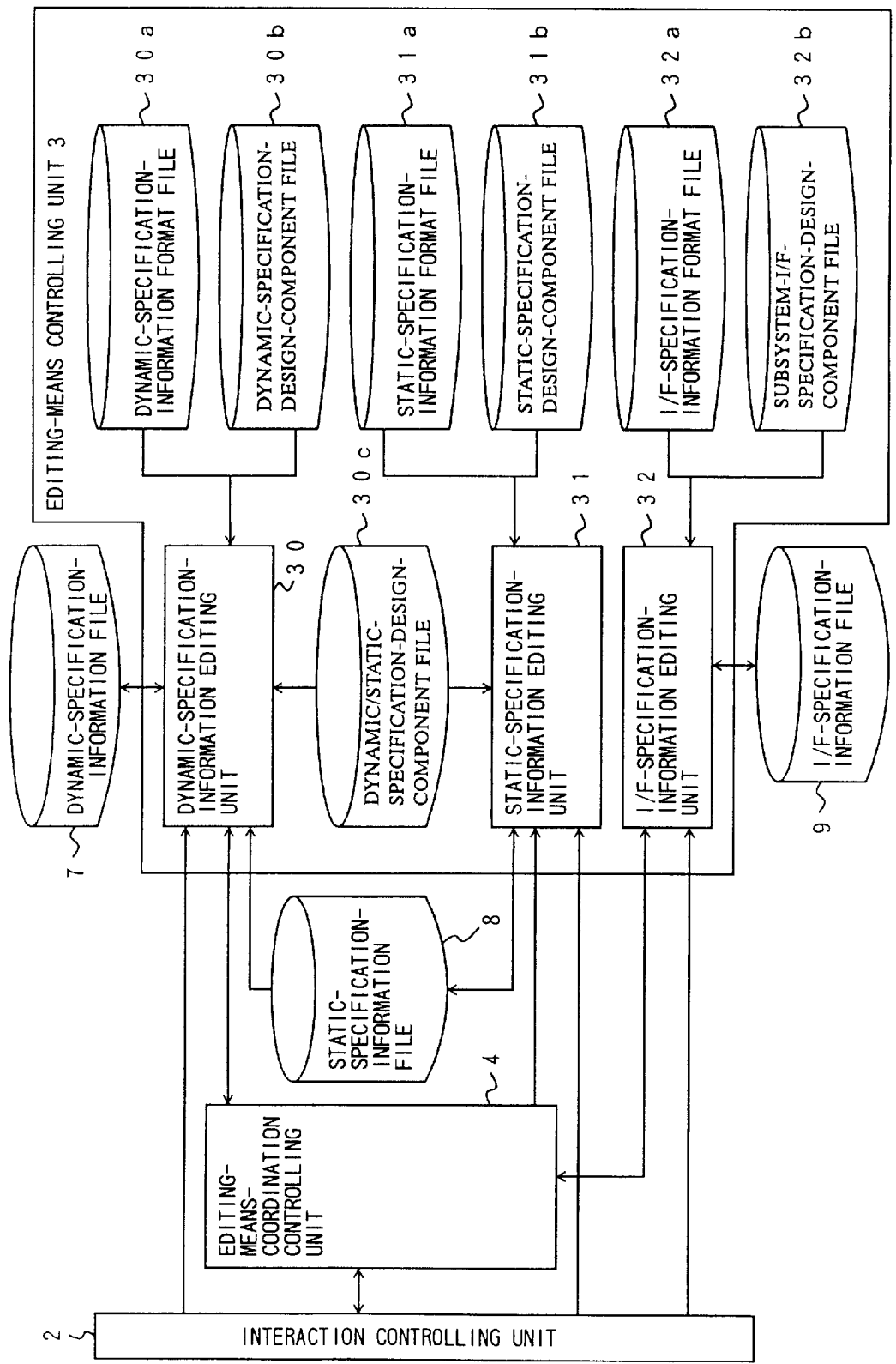
FIG. 3 is a partial block diagram of the software-design aiding device of FIG. 1.

FIG. 3 is a partial block diagram of the software-design aiding device, in which the editing-means controlling unit 3 is mainly shown. In FIG. 3, the same elements as those of FIG. 1 are referred to by the same numerals, and a description thereof will be omitted. Also, in FIG. 3, the initial-drawing-arrangement controlling unit 5 and the data-retrieval controlling unit 6 are omitted.

In FIG. 3, the editing-means controlling unit 3 includes a dynamic-specification-information editing unit 30, a static-specification-information editing unit 31, an IF-specification-information editing unit 32, a dynamic-specification-information format file 30a, a dynamic-specification-design-component file 30b, a dynamic/static-specification-design-component file 30c, a static-specification-information format file 31a, a static-specification-design-component file 31b, an I/F-specification-information format file 32a, and an subsystem-I/F-specification-design-component file 32b.

The dynamic-specification-information editing unit 30 corresponds to the editing means 3a, and is used for expressing the dynamic behavior as a specification in the task-division process. The static-specification-information editing unit 31 corresponds to the editing means 3b, and is used for expressing the static configuration as a specification in the task-division process. The IF-specification-information editing unit 32 corresponds to the editing means 3c, and is used for expressing the I/F-specification-information between the subsystems, which represents data of the events and the triggers. The dynamic-specification-information format file 30a, the static-specification-information format file 31a, and the I/F-specification-information format file 32a are files which store standard formats used by the dynamic-specification-information editing unit 30, the static-specification-information editing unit 31, and the IF-specification-information editing unit 32, respectively. Here, the standard formats are formatted frames to be displayed.

The dynamic-specification-design-component file 30b, the static-specification-design-component file 31b, and the subsystem-I/F-specification-design-component file 32b are files storing component information, which is used for representing specifications by the dynamic-specification-information editing unit 30, the static-specification-information editing unit 31, and the IF-specification-information editing unit 32, respectively. Here, the component information refers to a template drawing of each component.

The dynamic/static-specification-design-component file 30c is a file storing template drawings of components which are used in specification expressions and shared by both the dynamic-specification-information editing unit 30 and the static-specification-information editing unit 31. These components are referred to by dynamic/static-specification-design components or shared-specification-design components.

Namely, each of the dynamic-specification-information editing unit 30, the static-specification-information editing unit 31, and the IF-specification-information editing unit 32 is provided with one of the formats (30a through 32a) and with one of template drawings (30b through 32b) so as to edit at least one piece of the specification information (7 through 9). Also, the dynamic-specification-information editing unit 30 and the static-specification-information editing unit 31 are provided with the dynamic/static-specification-design components.

Figure 4:
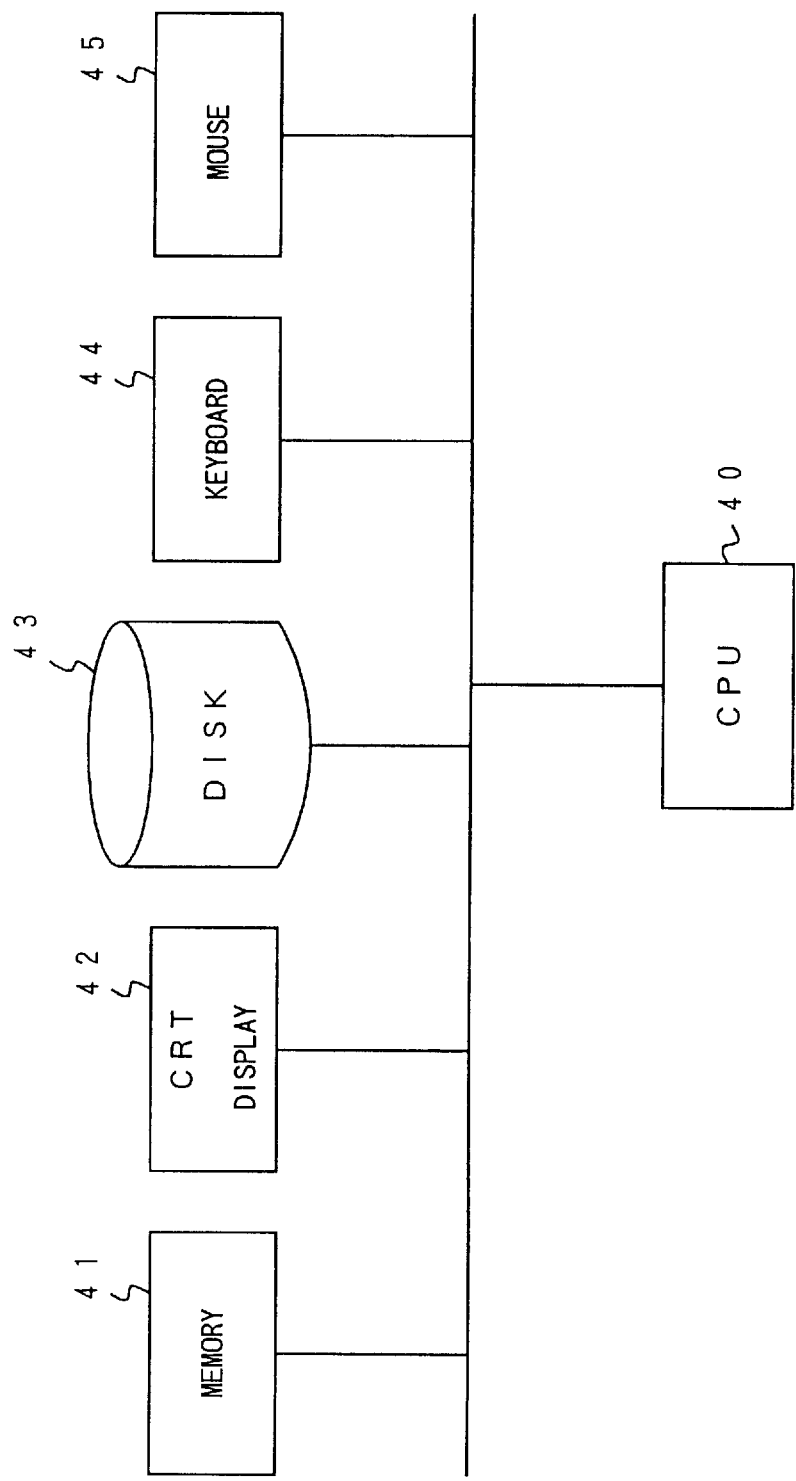
FIG. 4 shows a block diagram of a hardware configuration of the software-design aiding device according to an embodiment of the present invention.

FIG. 4 shows a block diagram of a hardware configuration of the software-design aiding device according to the embodiment of the present invention. In FIG. 4, the software-design aiding device includes a CPU 40, a memory 41, a CRT display 42, a disk unit 43, a keyboard 44, and a mouse 45. The disk unit 43 stores the various files described above, which are read into the memory 41 to be processed. Programs of the editing units are loaded into the memory 41 to be executed and controlled by the CPU 40. The designer operates on the keyboard 44 and the mouse 45 to design software by editing the static specification information and the dynamic specification information which are displayed on the CRT display 42.

Figure 5:
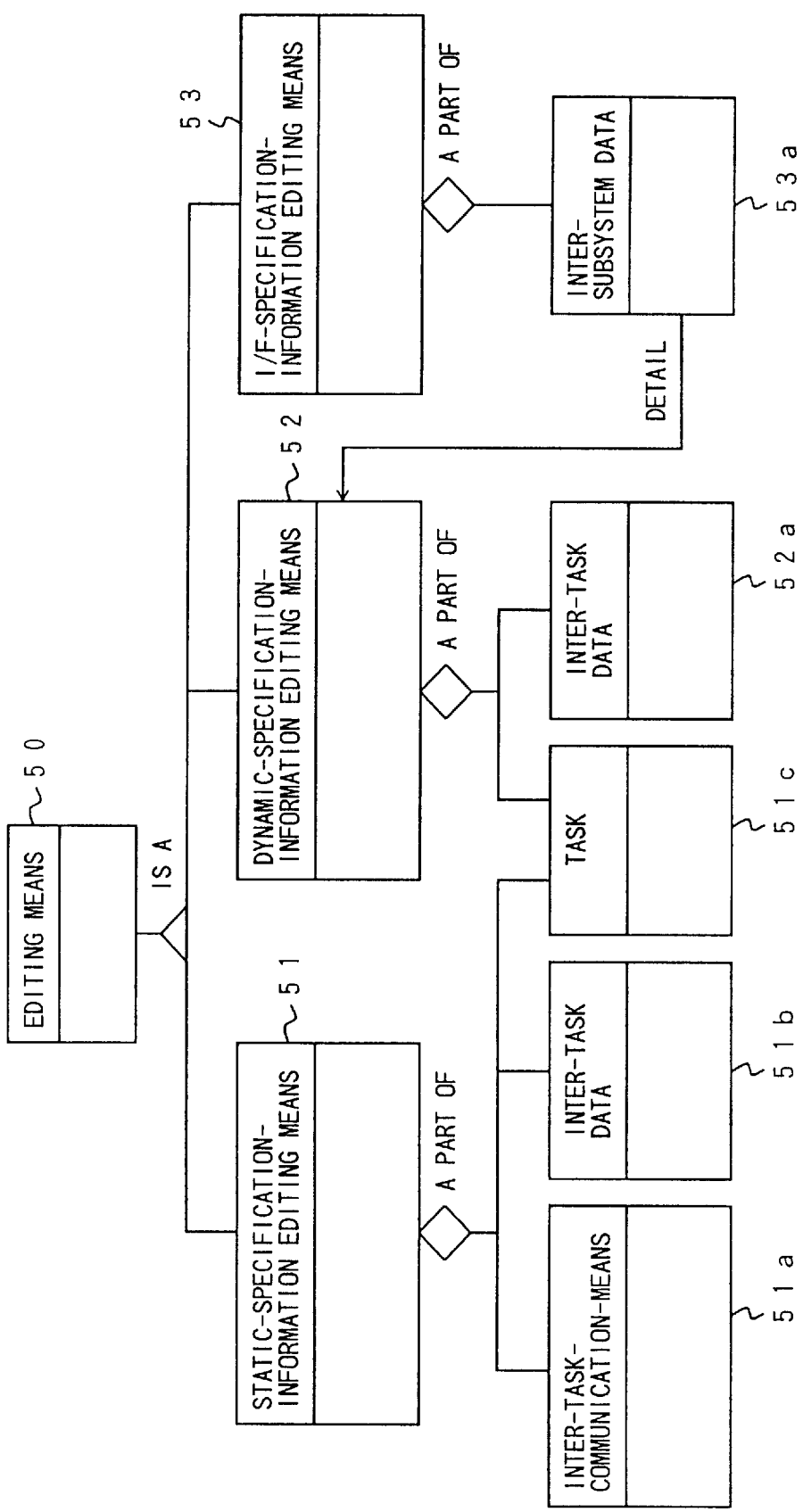
FIG. 5 is an illustrative drawing showing relations between editing means and design components used in the task-division process of FIG. 2.

FIG. 5 is an illustrative drawing showing relations between the editing means and the design components used in the task-division process. FIG. 5 is represented by the ERD (entity-relation diagram) which is used in the object-oriented scheme. The editing means 50 includes static-specification-information editing means 51, dynamic-specification-information editing means 52, and IF-specification-information editing means 53. The static-specification-information editing means 51 has inter-task-communication means 51a, inter-task data 51b, and a task 51c as design components. The dynamic-specification-information editing means 52 has the task 51c and inter-task data 52a as design components. The task 51c is shared by the static-specification-information editing means 51 and the dynamic-specification-information editing means 52. The IF-specification-information editing means 53 has inter-subsystem data 53a as a design component.

The inter-subsystem data 53a are the events and the triggers which activate operations of tasks. The dynamic-specification-information editing means 52 is used for detailing the inter-subsystem data 53a.

In the following, editing displays for the dynamic specification and the static specification will be described by using examples. The dynamic specification information is an inter-task sequence which represents relations between tasks in a time sequence by using the events and the triggers.

Figure 6:
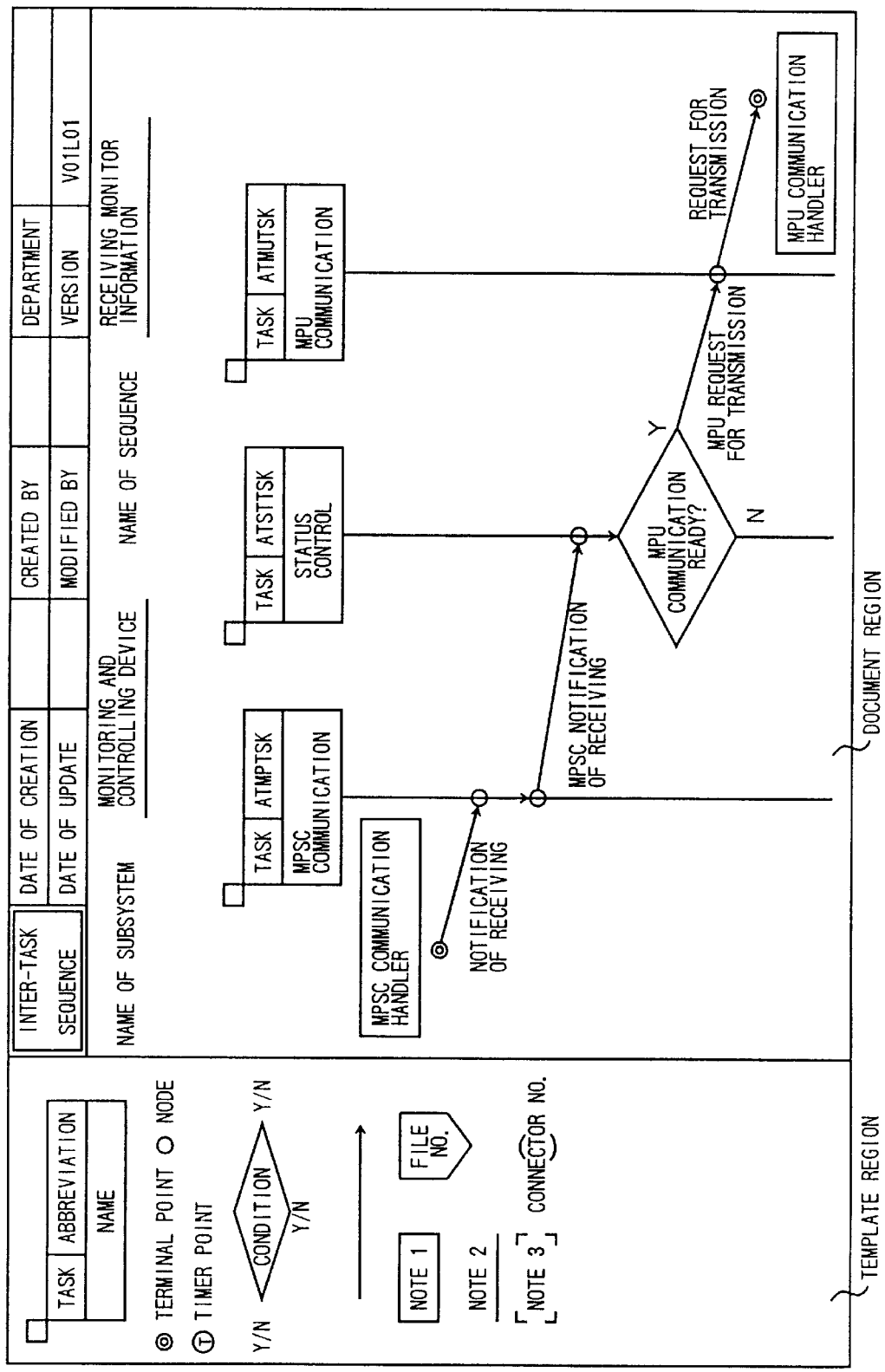
FIG. 6 is an illustrative drawing showing an example of an editing display used by a dynamic-specification-information editing unit of FIG. 3.

FIG. 6 is an illustrative drawing showing an example of the editing display used by the dynamic-specification-information editing unit 30. First, an editing of the inter-task sequence is started by opening the dynamic-specification-information editing unit 30 with selections of names of the subsystems and a name of a sequence. Then, a display image shown in FIG. 6 is displayed.

When this display image is displayed, both a format for a document region including such items as a title, a date of creation, a creator, etc., and a format for a template region are read out from the dynamic-specification-information format file 30a (see FIG. 3). As shown in FIG. 6 with reference to FIG. 3, dynamic/static-specification-design components (tasks in this case) obtained from the dynamic/static-specification-design-component file 30c are displayed in the template region, and so are those components obtained from the dynamic-specification-design-component file 30b which are used for designing the dynamic specification information. Components are selected from the template region by the designer operating on the mouse 45 and the like, and are used for designing in the document region.

When specification information (a document) created in advance is to be updated, that specification information is selected and extracted from the dynamic-specification-information file 7, and is displayed in the document region as shown in FIG. 6. On the other hand, the document region is initially blank when new specification information is to be created. Tasks are arranged in the document region, and data of the events and the triggers (I/F information between the subsystems) are put in appropriate places to design the inter-task sequence.

The example shown in FIG. 6 concerns a monitoring and controlling device for a communication system, and shows an inter-task relation for receiving monitoring information. In FIG. 6, each task is triggered to operate by the communication mechanisms such as a notification of receiving, a request for transmission, etc.

Figure 7:
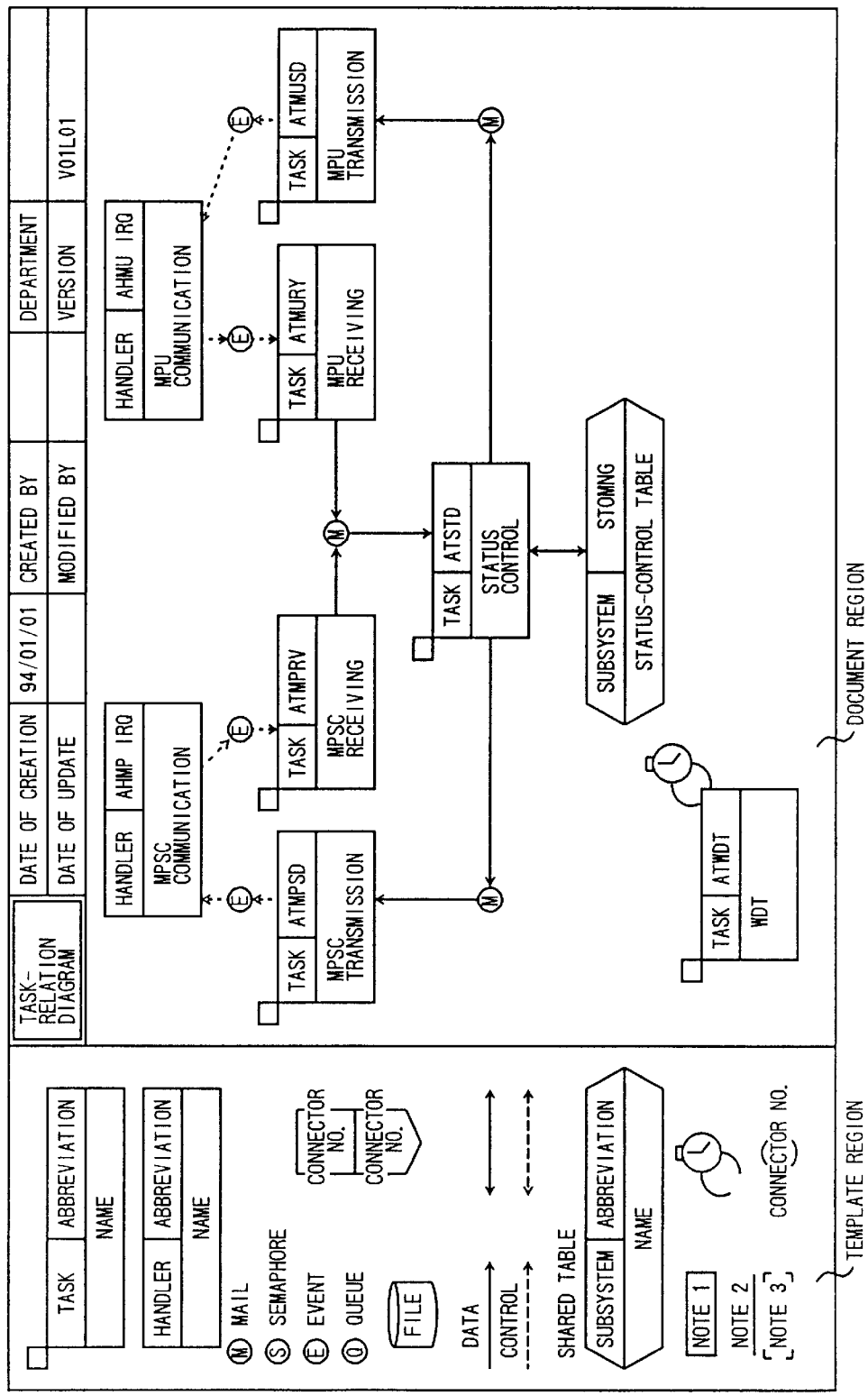
FIG. 7 is an illustrative drawing showing an example of an editing display used by a static-specification-information editing unit of FIG. 3.

FIG. 7 is an illustrative drawing showing an example of the editing display used by the static-specification-information editing unit 31. First, an editing of the task-relation diagram is started by opening the static-specification-information editing unit 31. Then, a display image shown in FIG. 7 is displayed.

When this display image is displayed, formats for a document region and a template region are read out from the static-specification-information format file 31a (see FIG. 3). As shown in FIG. 7 with reference to FIG. 3, dynamic/static-specification-design components (tasks in this case) obtained from the dynamic/static-specification-design-component file 30c are displayed in the template region, and so are components obtained from the static-specification-design-component file 31b. Components shown in the template region of FIG. 7 includes template drawings of tasks, mail, semaphores, events, queues, files, data, control, shared tables, etc. Those components are selected from the template region by the designer operating on the mouse 45 and the like, and are used for designing in the document region.

When specification information (a document) created in advance is to be updated, that specification information is selected and extracted from the static-specification-information file 8, and is displayed in the document region as shown in FIG. 7. On the other hand, the document region is initially blank when new specification information is to be created. Tasks are arranged in the document region, and components for representing relations between tasks are put in appropriate places to design the inter-task sequence.

The example of FIG. 7 shows a task-relation diagram for tasks which are used for communications between devices of the communication system. In the example of FIG. 7, the events shown as "E" and the mail shown as "M" which are the communication mechanisms between the tasks are arranged in appropriate places.

In the task-division process according to the present invention, the editing of the inter-task relation (dynamic specification information) having the display image as shown by an example of FIG. 6 and the editing of the task-relations diagram (static specification information) having the display image as shown by an example of FIG. 7 are conducted by going back and forth between these two display images.

Figure 8:
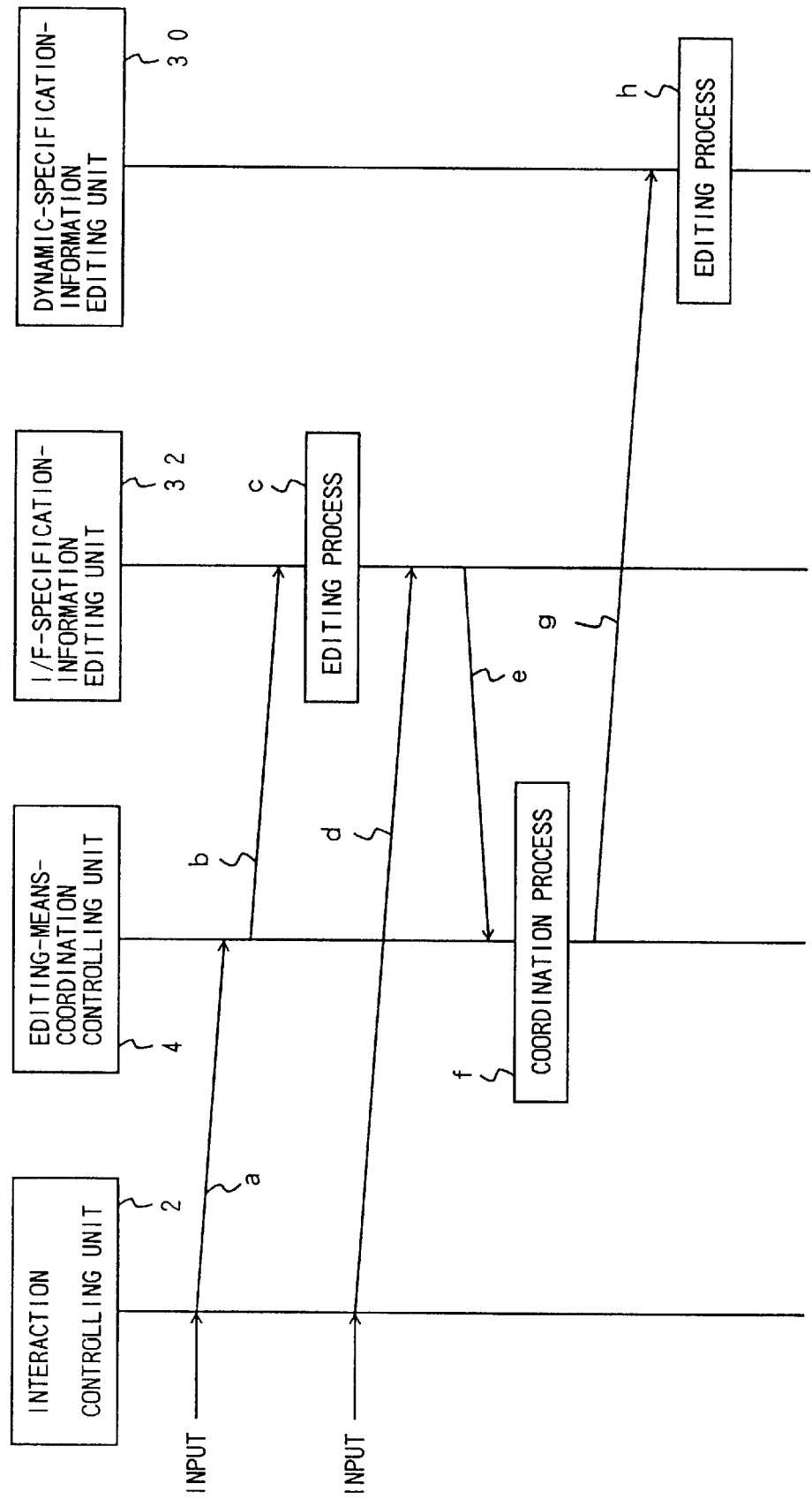
FIG. 8 is a timing chart of a first activation sequence according to the embodiment of the present invention.
Figure 9:
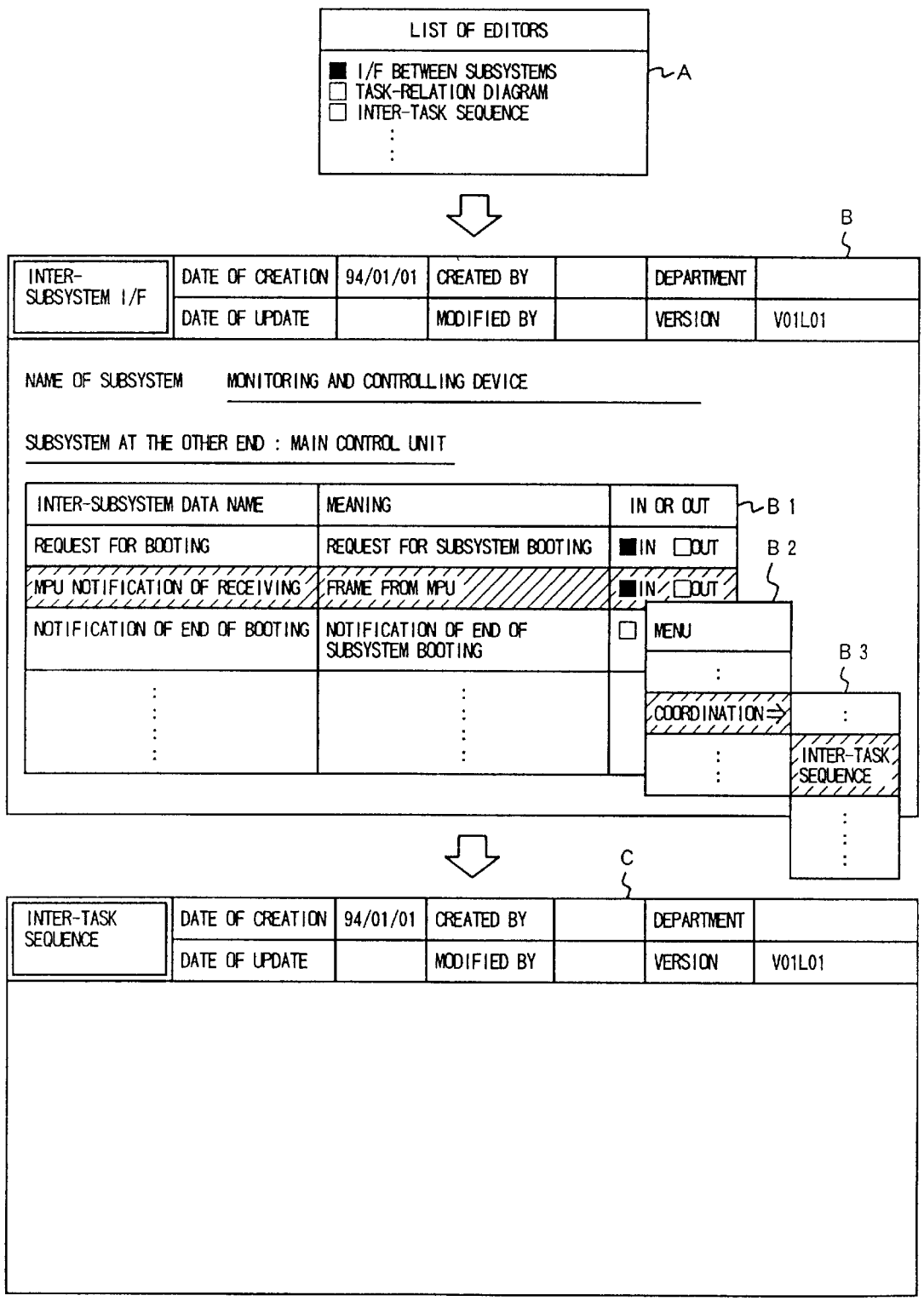
FIG. 9 is an illustrative drawing showing a display image when the first activation sequence of FIG. 8 is used as a design aiding tool.

FIG. 8 is a timing chart of an activation sequence according to the embodiment of the present invention. FIG. 8 shows a first example in which the IF-specification-information editing unit 32 is requested to be activated. FIG. 9 is an illustrative drawing showing a display image when the activation sequence of FIG. 8 is used as a design-aiding tool.

First, the interaction controlling unit 2 displays a list of the editors (editing means) on the CRT display 42 (FIG. 4) as shown by a window A of FIG. 9. When the designer selects "I/F between subsystems" in the window A, the interaction controlling unit 2 sends a request for an activation of the IF-specification-information editing unit 32 to the editing-means-coordination controlling unit 4, as indicated by "a" in FIG. 8. The editing-means-coordination controlling unit 4, which has a table, analyzes the request by using the table, and sends a request for an activation to the IF-specification-information editing unit 32, as indicated by "b" in FIG. 8. In response to the request, the IF-specification-information editing unit 32 starts an editing process shown as "c" in FIG. 8. When the editing process of the inter-subsystem I/F is activated, the inter-subsystem-I/F specification information which is designed in advance is displayed as shown by a window B of FIG. 9. Instead, a design display using a format stored in the I/F-specification-information format file 32a and components stored in subsystem-I/F-specification-design-component file 32b may be displayed.

An example shown in the window B of FIG. 9 shows data (events) between a subsystem of the monitoring-and-controlling device and a subsystem of a main controlling unit when a design target is a communication system. These events are listed as shown in a window B1. When the designer wishes to edit an event "MPU notification of receiving", the designer selects "IMPU notification of receiving" from the items listed in the window B1. In response to the selection, a window B2 showing a menu is displayed. A selection of "coordination" in the window B2 results in a menu shown in a window B3 being displayed. In the menu of the window B3, "inter-task sequence" is selected.

When "inter-task sequence" is selected, the interaction controlling unit 2 sends a request for an activation of the dynamic-specification-information editing unit 30 to the IF-specification-information editing unit 32, as indicated by "d" in FIG. 8. The IF-specification-information editing unit 32 decodes this request, and sends it to the editing-means-coordination controlling unit 4, as indicated by "e" in FIG. 8. The editing-means-coordination controlling unit 4 looks up the table, and starts a coordination process, as indicated by "f". Further, the editing-means-coordination controlling unit 4 sends a request for an activation to the dynamic-specification-information editing unit 30, as indicated by "g". In response to the request, the dynamic-specification-information editing unit 30 starts an editing process, as indicated by "h".

When the editing process is started, an initial display of the inter-task sequence is displayed as shown in a window C of FIG. 9. In this case, there is nothing shown in the document region.

Figure 10:
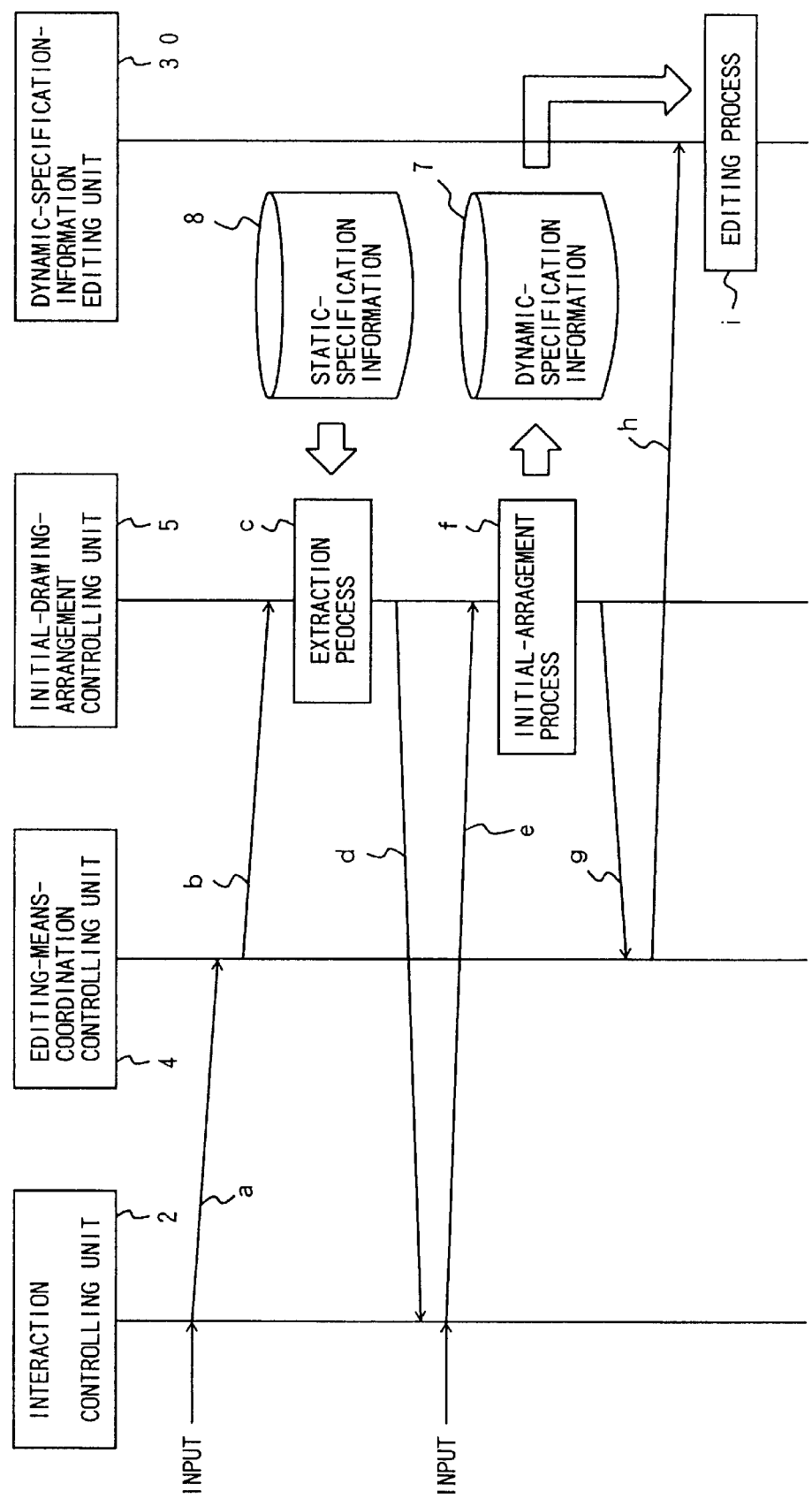
FIG. 10 is a timing chart of a second activation sequence according to the embodiment of the present invention.
Figure 11:
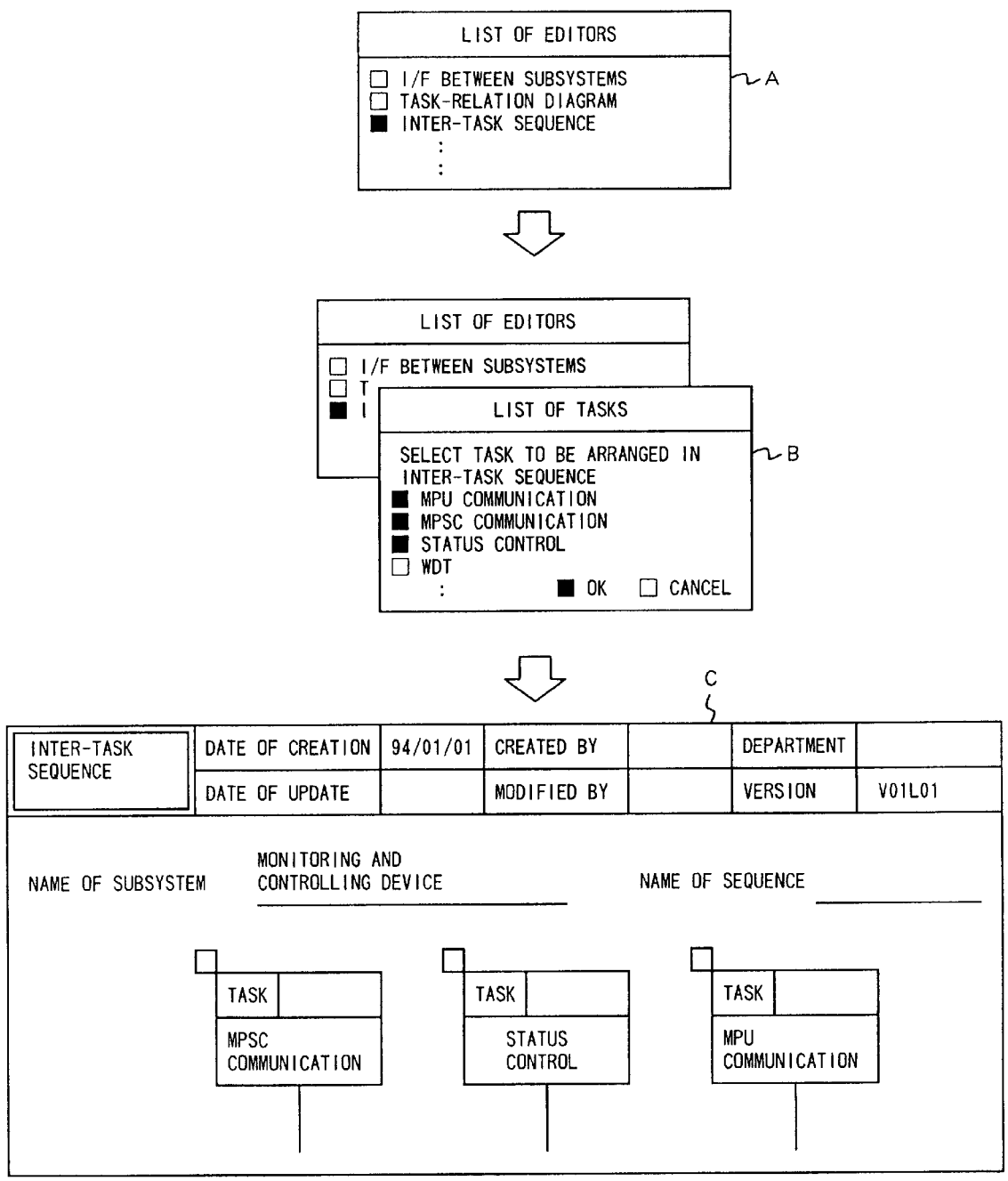
FIG. 11 is an illustrative drawing showing a display image when the second activation sequence of FIG. 10 is used as a design aiding tool.

FIG. 10 is a timing chart of an activation sequence according to the embodiment of the present invention. FIG. 10 shows a second example in which the dynamic-specification-information editing unit 30 is requested to be activated. FIG. 11 is an illustrative drawing showing a display image when the activation sequence of FIG. 10 is used as a design-aiding tool.

First, the interaction controlling unit 2 displays a list of the editors (editing means) as shown by a window A of FIG. 11. When the designer selects "inter-task sequence" in the window A by using the mouse 45 (FIG. 4), the interaction controlling unit 2 sends a request for an activation of the dynamic-specification-information editing unit 30 to the editing-means-coordination controlling unit 4, as indicated by "a" in FIG. 10. The editing-means-coordination controlling unit 4 analyzes the request, and sends a request for an initial arrangement to the initial-drawing-arrangement controlling unit 5, as indicated by "b" in FIG. 10, so as to create an initial arrangement of the inter-task sequence. The initial-drawing-arrangement controlling unit 5 starts an extraction process (indicated by "c") to extract static specification information from the static specification-information file 8. Then, the initial-drawing-arrangement controlling unit 5 sends the extracted task information as a task list to the interaction controlling unit 2, as indicated by "d". This task list is displayed as shown in a window B of FIG. 11.

The designer selects names of tasks from the task list by using the mouse 45, and gives an instruction to execute. In this case, input errors (which can be fatal in the program design), which may occur if the designer has to type in task names one by one, can be avoided. Also, an operation time for making such a selection can be shortened.

The selected task names are sent to the initial-drawing-arrangement controlling unit 5, as indicated by "e" in FIG. 10. The initial-drawing-arrangement controlling unit 5 starts an initial arrangement process (indicated by "f") to store the selected tasks in the dynamic-specification-information file 7. Then, the initial-drawing-arrangement controlling unit 5 notifies the editing-means-coordination controlling unit 4 of an end of the initial arrangement process, as indicated by "g". Then, the editing-means-coordination controlling unit 4 sends a request for an activation to the dynamic-specification-information editing unit 30, as indicated by "h". The dynamic-specification-information editing unit 30 starts the editing process (indicated by "i") to show a display image for the inter-task sequence. In the display image, the selected tasks are arranged by looking up the dynamic-specification-information file 7.

A window C of FIG. 11 shows the display image for the inter-task sequence, in which the tasks selected in the window B are positioned in an initial arrangement.

Figure 12:
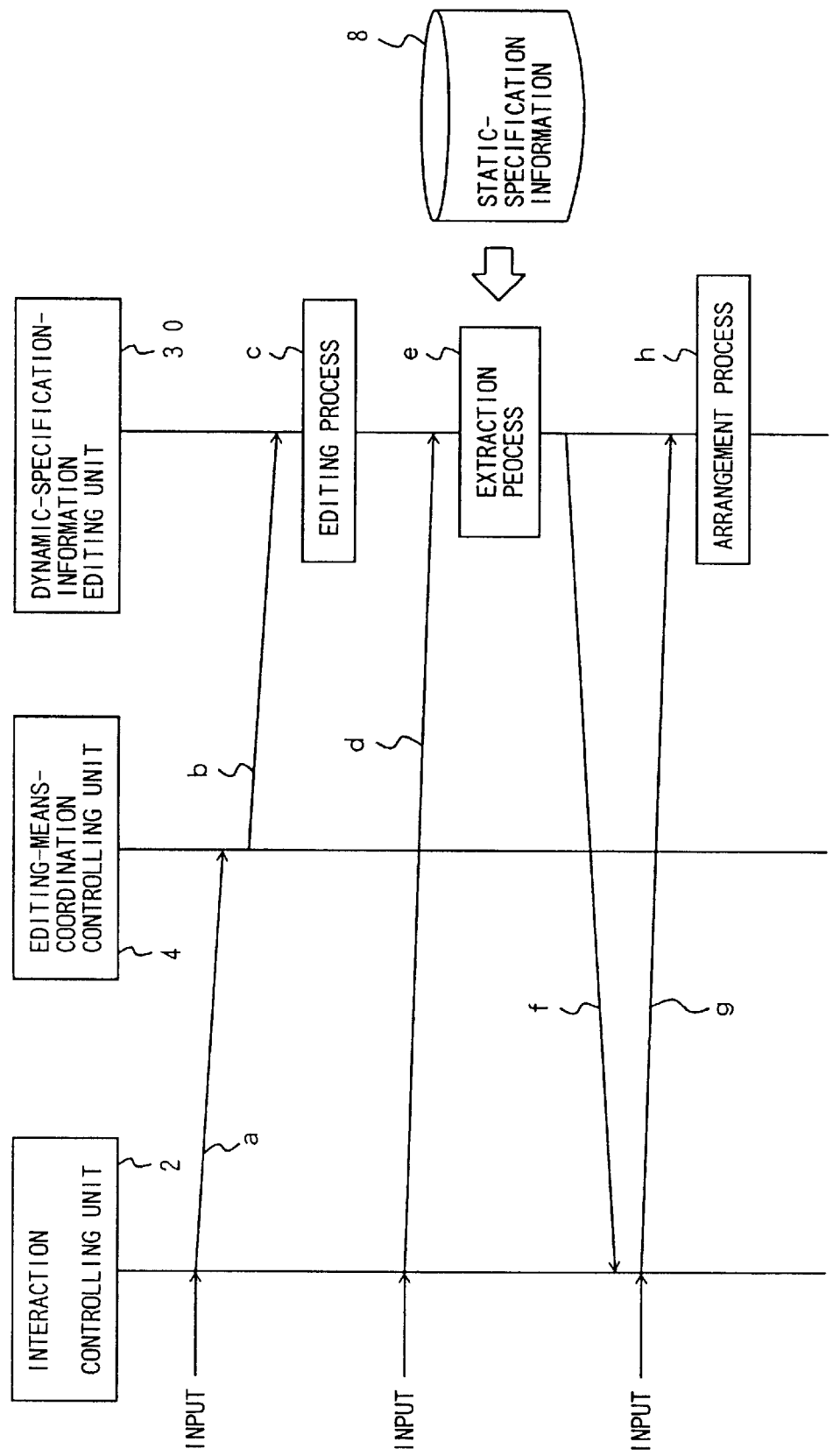
FIG. 12 is a timing chart of a third activation sequence according to the embodiment of the present invention.
Figure 13:
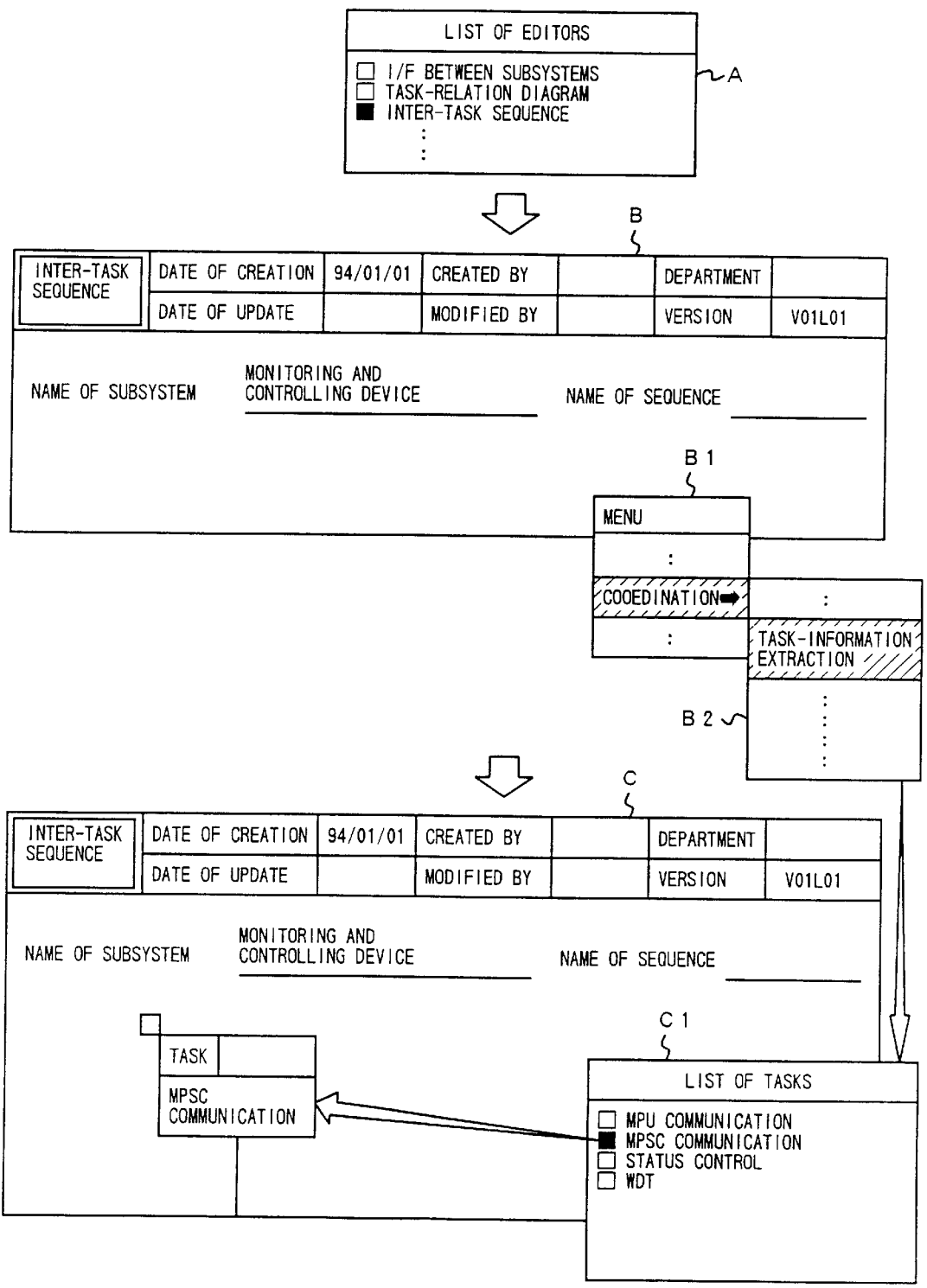
FIG. 13 is an illustrative drawing showing a display image when the third activation sequence of FIG. 12 is used as a design aiding tool.

FIG. 12 is a timing chart of an activation sequence according to the embodiment of the present invention. FIG. 12 shows a third example in which the dynamic-specification-information editing unit 30 is requested to be activated. FIG. 13 is an illustrative drawing showing a display image when the activation sequence of FIG. 12 is used as a design aiding tool.

When the designer selects "inter-task sequence" in a window A of FIG. 13, the interaction controlling unit 2 sends a request for an activation of the dynamic-specification-information editing unit 30 to the editing-means-coordination controlling unit 4, as indicated by "a" in FIG. 12. Different from the example of FIG. 10 in which the initial-drawing-arrangement controlling unit 5 is activated, the editing-means-coordination controlling unit 4 sends a request for an activation to the dynamic-specification-information editing unit 30, as indicated by "b" in FIG. 12. In response to the request, the dynamic-specification-information editing unit 30 starts an editing process shown as "c" in FIG. 12. When the editing process is activated, a display image which is generated by the editing process is displayed via the interaction controlling unit 2, as shown by a window B of FIG. 13. Since no initial arrangement process is carried out, no task (static specification information) is displayed.

When the designer wishes to obtain some task information, the designer gives an instruction to display a menu, shown in a window B1. When an item "expansion" is selected from a menu of the window B1, a menu of a window B2 is displayed. When an item "task-information extraction" is selected from the menu of the window B2, the interaction controlling unit 2 sends a request for the static specification information to the dynamic-specification-information editing unit 30, as indicated by "d" in FIG. 12. In response to the request, the dynamic-specification-information editing unit 30 starts an extraction process (indicated by "e") to extract the static specification information from the static specification-information file 8. Then, the dynamic-specification-information editing unit 30 sends the extracted task information as a task list to the interaction controlling unit 2, as indicated by "f". As a result, the task list is displayed in a window C1 of FIG. 13.

When the designer selects task names from the task list of the window C1, the selected task names are sent to the dynamic-specification-information editing unit 30, as indicated by "g" of FIG. 12. The dynamic-specification-information editing unit 30 starts an arrangement process (indicated by "h") to arrange the selected tasks. The arranged tasks are displayed via the interaction controlling unit 2, as shown in a window C of FIG. 13.

Figure 14:
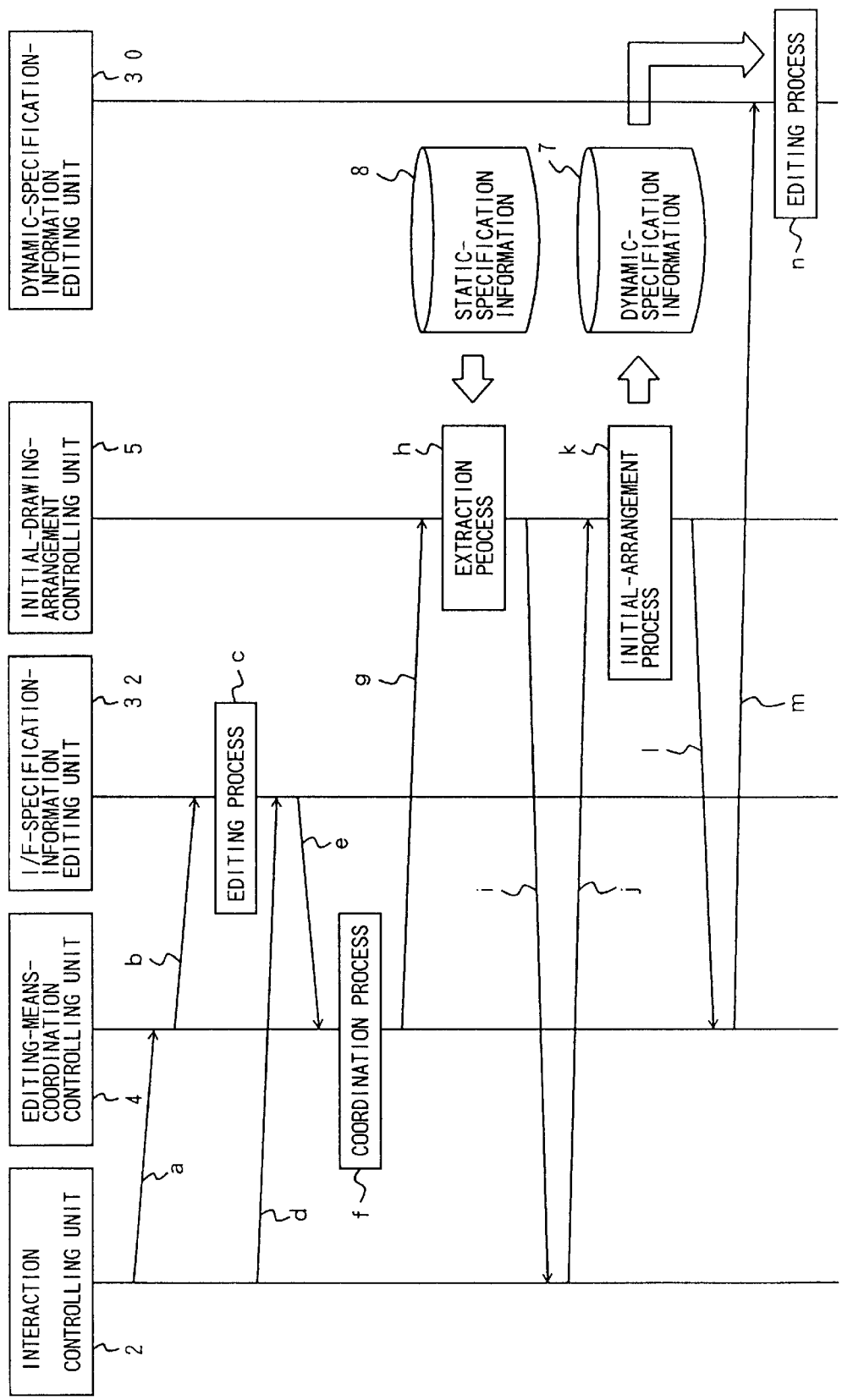
FIG. 14 is a timing chart of a fourth activation sequence according to the embodiment of the present invention.
Figure 15:
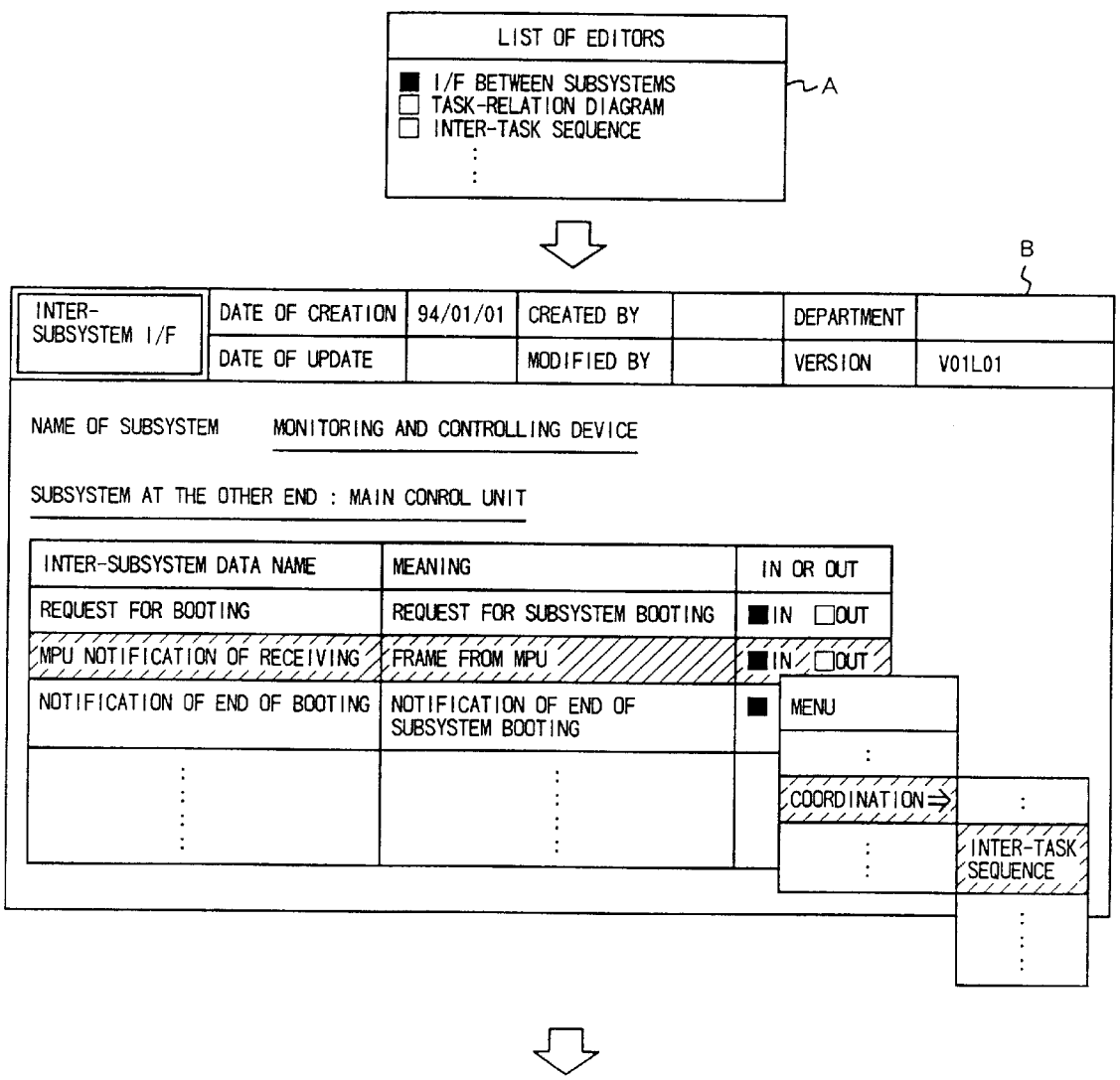
FIG. 15 is an illustrative drawing showing a display image when the forth activation sequence of FIG. 14 is used as a design aiding tool.

FIG. 14 is a timing chart of an activation sequence according to the embodiment of the present invention. FIG. 14 shows a fourth example in which the IF-specification-information editing unit 32 is requested to be activated first, and, then, the dynamic-specification-information editing unit 30 is activated after an initial arrangement of tasks. FIG. 15 and FIG. 16 are illustrative drawings showing display images when the activation sequence of FIG. 14 is used as a design aiding tool.

First, the same sequence as those indicated by "a" through "f" in FIG. 8 are carried out. When an item "I/F between subsystems" is selected from a list of the editors in a window A of FIG. 15, the interaction controlling unit 2 sends a request for an activation of the IF-specification-information editing unit 32 to the editing-means-coordination controlling unit 4, as indicated by "a" in FIG. 14. The editing-means-coordination controlling unit 4 sends a request for an activation to the IF-specification-information editing unit 32, as indicated by "b". In response to the request, the IF-specification-information editing unit 32 starts an editing process shown as "c".

When the editing process is activated, a display image for the inter-subsystem-I/F specification information is displayed via the interaction controlling unit 2, as shown by a window B of FIG. 15. When the designer wishes to edit an event "MPU receiving notification", the designer selects "MPU receiving notification" from the items listed in the window B. In response to the selection, windows showing menus are displayed in sequence in the same manner as in FIG. 9. When an item "inter-task sequence" is selected, the interaction controlling unit 2 sends a request for an activation of the dynamic-specification-information editing unit 30 to the IF-specification-information editing unit 32, as indicated by "d" in FIG. 14. In response, the IF-specification-information editing unit 32 sends the request to the editing-means-coordination controlling unit 4, as indicated by "e".

Then, the editing-means-coordination controlling unit 4 starts a coordination process, as indicated by "f".

Different from the example of FIG. 8, the editing-means-coordination controlling unit 4 sends a request for an initial arrangement to the initial-drawing-arrangement controlling unit 5, as indicated by "g". A sequence after the sending of this request is the same as those indicated by "c" through "i" in FIG. 10.

In response to this request, the initial-drawing-arrangement controlling unit 5 starts an extraction process (indicated by "h" in FIG. 14) to extract static specification information from the static specification-information file 8. Then, the initial-drawing-arrangement controlling unit 5 sends the extracted task information as a task list to the interaction controlling unit 2, as indicated by "i". This task list is displayed via the interaction controlling unit 2, as shown in a window C of FIG. 16.

The designer selects names of tasks from the task list, and the selected task names are sent to the initial-drawing-arrangement controlling unit 5, as indicated by "j" in FIG. 14. The initial-drawing-arrangement controlling unit 5 starts an initial arrangement process (indicated by "k") to store the selected tasks in the dynamic-specification-information file 7. Then, the initial-drawing-arrangement controlling unit 5 notifies the editing-means-coordination controlling unit 4 of an end of the initial arrangement process, as indicated by "1". Then, the editing-means-coordination controlling unit. 4 sends a request for an activation to the dynamic-specification-information editing unit 30, as indicated by "m". The dynamic-specification-information editing unit 30 starts the editing process (indicated by "n") to show a display image for the inter-task sequence. In the display image, the selected tasks are arranged by looking up the dynamic-specification-information file 7. A window D of FIG. 16 shows the display image in which each task is positioned in the initial arrangement.

FIG. 17 is a timing chart of an activation sequence according to the embodiment of the present. invention. FIG. 17 shows a fifth example in which the IF-specification-information editing unit 32 is activated first in the same manner as in FIG. 8, and, then, the dynamic-specification-information editing unit 30 is activated in the same manner as in FIG. 12.

First, a sequence indicated by "a" through "h" in FIG. 17 carries out the same operations as those indicated by "a " all through "h" in FIG. 8, and a description thereof will be omitted. In response to the request for an activation sent from the editing-means-coordination controlling unit 4, the dynamic-specification-information editing unit 30 is activated to start the editing process (indicated by "h"). At this point of time, the display image for the inter-task sequence shown in the window C of FIG. 9 is blank and has no task in the document region.

When a request for the static specification information is entered in order to set task names, the request is sent from the interaction controlling unit 2 to the dynamic-specification-information editing unit. 30, as indicated by "i" in FIG. 17. After that, a sequence indicated by "j" through "m" in FIG. 17 which is the same sequence as indicated by "e" through "h" in FIG. 12 is carried out. Through this sequence, tasks are selected by the designer, and the selected tasks 15 are shown in the display image for the inter-task sequence.

Figure 18:
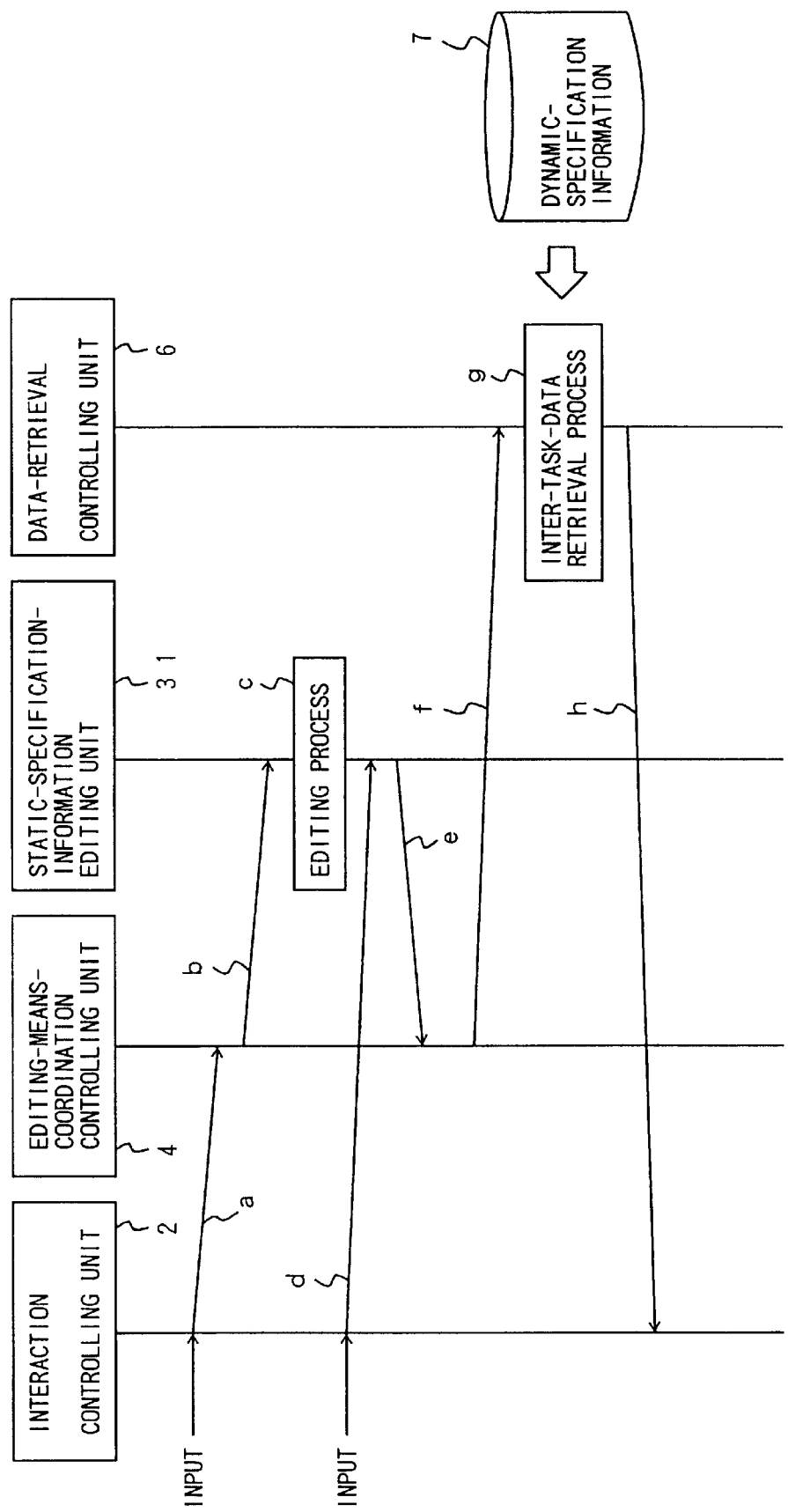
FIG. 18 is a timing chart of an activation sequence for retrieving inter-task data which is indicated by a designer.

FIG. 18 is a timing chart of an activation sequence for retrieving the inter-task data which is indicated by the designer. FIG. 19 is an illustrative drawing showing an example of a display image when the activation sequence of FIG. 18 is used as a design aiding tool.

When a malfunction occurs in a device of a designing target, it may be known based on the log information that a given inter-task data is generated at the time of the malfunction in the course of an execution of a program. Since the dynamic specification information contains all the inter-task data, an extraction of the given inter-task data can. help to understand situations under which the malfunction occurred. This is one of the situations where the activation sequence of FIG. 18 is useful.

When the designer or an administrator of the device selects an item "task-relation diagram" from the list of the editors (e.g., shown in the window A of FIG. 9), the interaction controlling unit 2 sends a request for an activation of the static-specification-information editing unit 31 to the editing-means-coordination controlling unit 4, as indicated by "a" in FIG. 18. The editing-means-coordination controlling unit 4 decodes this request, and sends a request for an activation to the static-specification-information editing unit 31, as indicated by "b". Then, the static-specification-information editing unit 31 starts an editing process (indicated by "c") to display the static specification information via the interaction controlling unit 2. A window A of FIG. 19 is an example of the task-relation diagram which shows the static specification information. At the window A of FIG. 19, a menu is called up in which an item "inter-task-data retrieval" is provided. After selecting this item, the designer or the administrator specifies two tasks which relate to the inter-task data to be retrieved. In an example of FIG. 19, tasks T1 and T2 are selected.

Then, the interaction controlling unit 2 sends a request for the inter-task-data retrieval to the static-specification-information editing unit 31, as indicated by "d" in FIG. 18. In response, the static-specification-information editing unit 31 sends the request to the editing-means-coordination controlling unit 4, as indicated by "e". The editing-means-coordination controlling unit 4 recognizes the request, and sends a request for the inter-task-data retrieval to the data-retrieval controlling unit 6 (see FIG. 1), as indicated by "f". Upon receiving the request, the data-retrieval controlling unit 6 starts an inter-task-data-retrieval process (indicated by "g") to search for inter-task data in the dynamicspecification-information file 7. Retrieved information on the inter-task data is sent to the interaction controlling unit 2 to be displayed, as indicated by "h". As a result, a list of the inter-task data between the selected two tasks is displayed as shown in a window B1 of FIG. 19.

Figure 20:
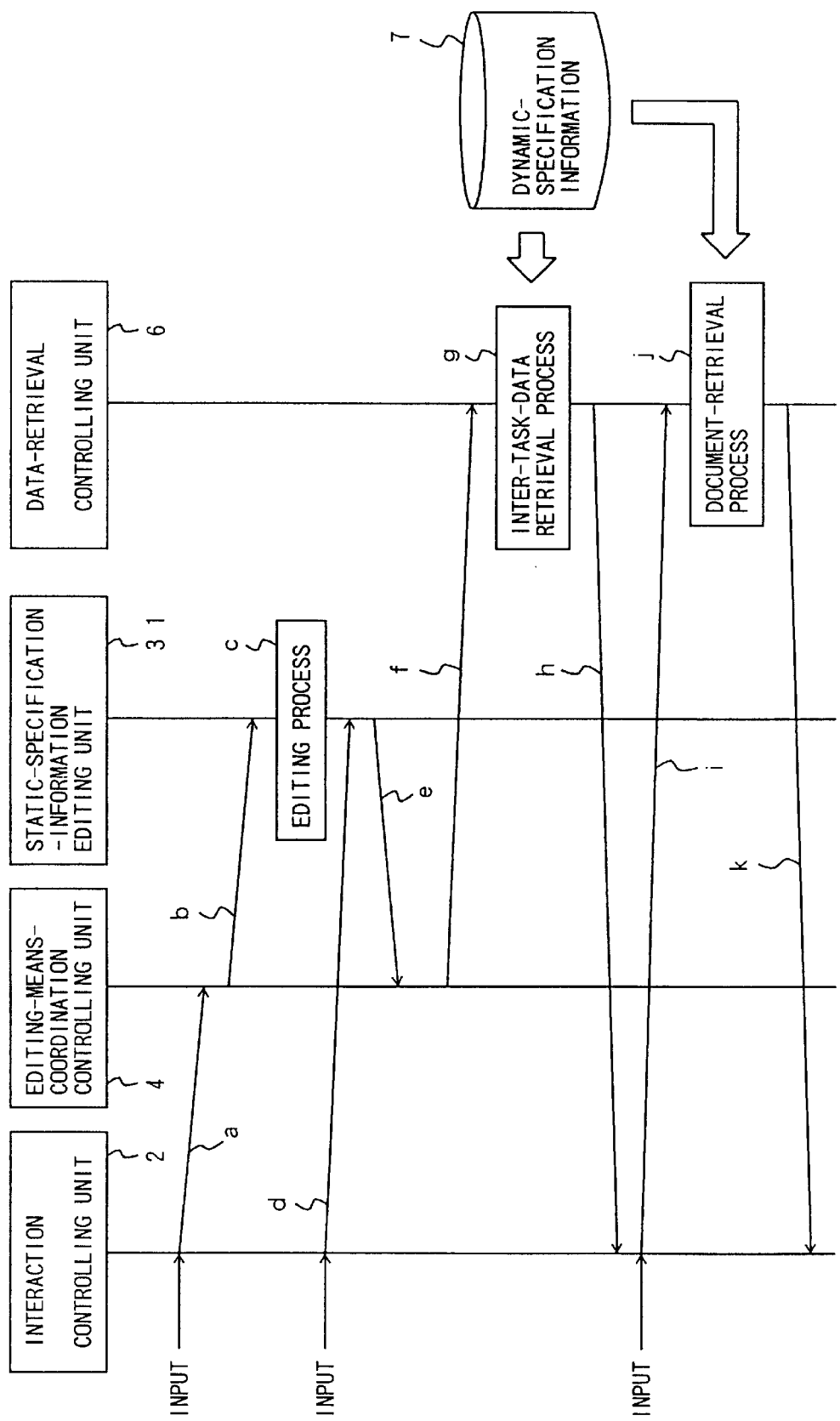
FIG. 20 is a timing chart of an activation process for retrieving a document relating to a retrieved inter-task data.

FIG. 20 is a timing chart of an activation process for retrieving a document relating to retrieved inter-task data. The same as the sequence of FIG. 18, the activation sequence of FIG. 20 is used for analyzing inter-task data when a malfunction is generated.

Figure 21:
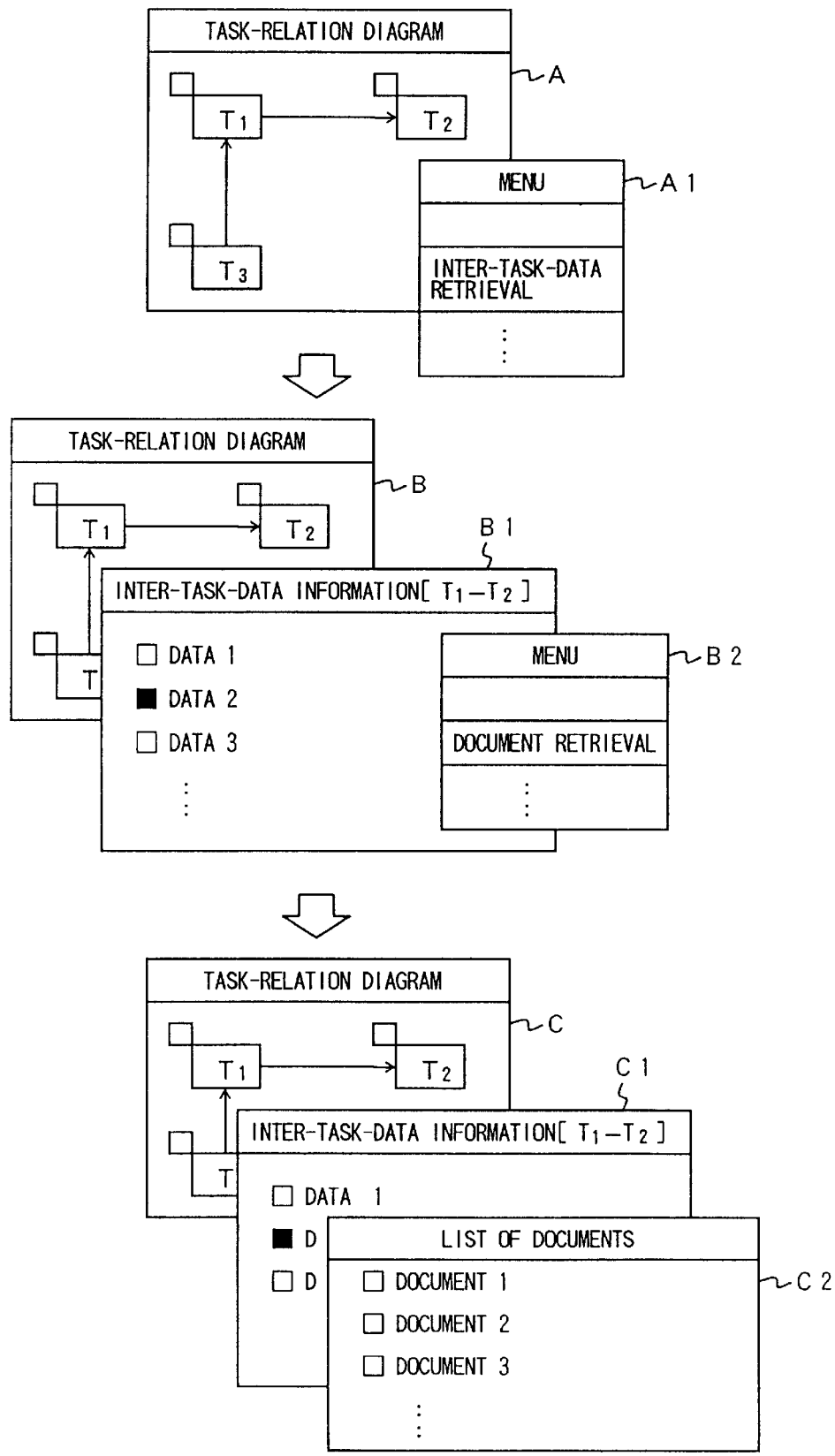
FIG. 21 is an illustrative drawing showing an example of a display image when the activation process of FIG. 20 is used as a design aiding tool.
Figure 22:
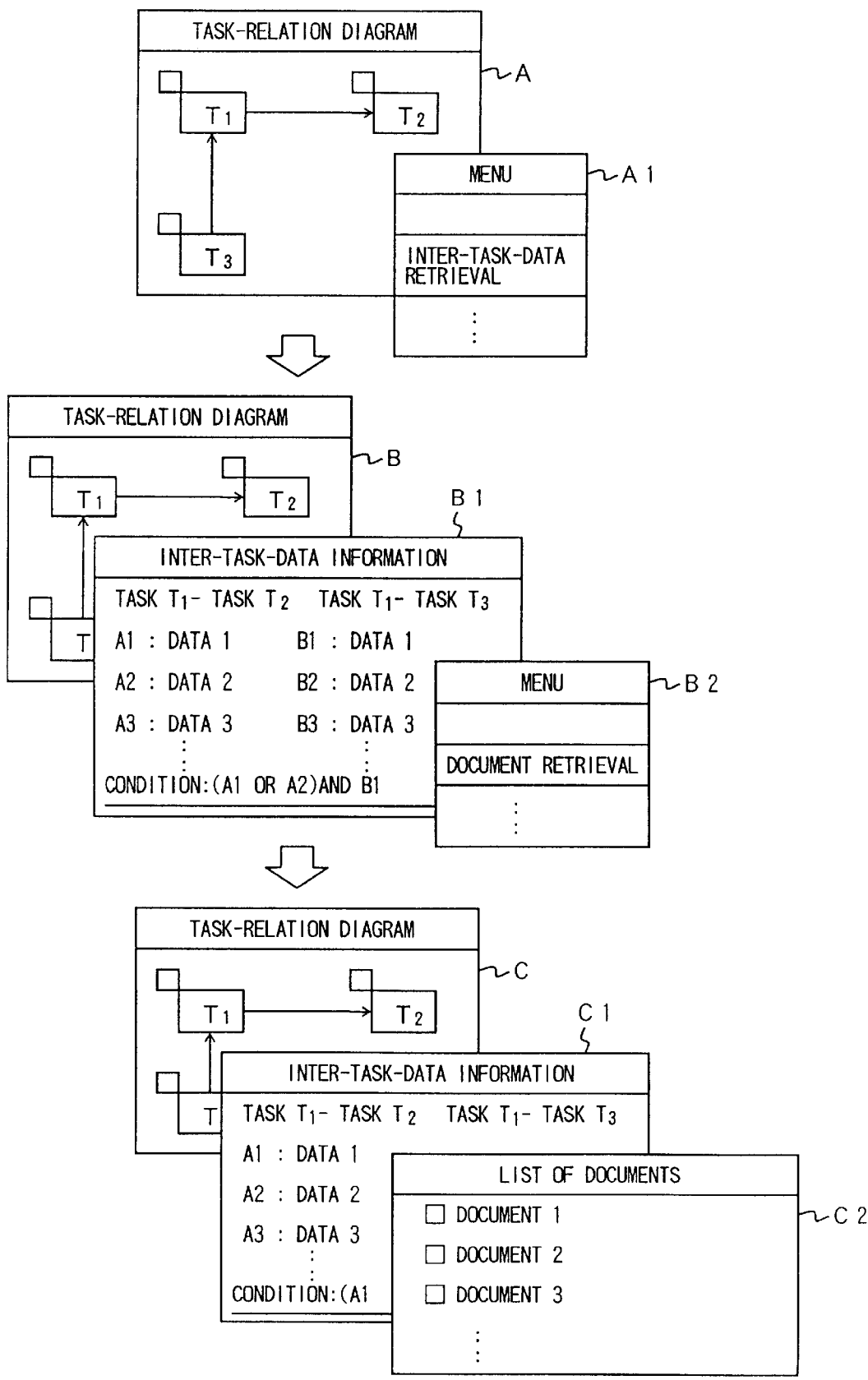
FIG. 22 is an illustrative drawing showing another example of a display image when the activation process of FIG. 20 is used as a design aiding tool.

FIG. 21 is an illustrative drawing showing an example of a display image when the activation process of FIG. 20 is used as a design aiding tool. FIG. 22 is an illustrative drawing showing another example of a display image when the activation process of FIG. 20 is used as a design aiding tool.

When the designer or the administrator selects the item "task-relation diagram", the interaction controlling unit 2 sends a request for an activation of the static-specification-information editing unit 31, as indicated by "a". The editing-means-coordination controlling unit 4 recognizes this request, and sends the request to the static-specification-information editing unit 31, as indicated by "b". Then, the static-specification-information editing unit 31 starts the editing process indicated by "c". By doing so, the static-specification-information editing unit 31 displays the static specification information via the interaction controlling unit 2. Windows A of FIG. 21 and FIG. 22 are examples of the task-relation diagrams which show the static specification information. At one of the windows A, a menu is called up in which an item "inter-task-data retrieval" is provided. After selecting this item, the designer or the administrator specifies a plurality of tasks which relate to the inter-task data to be retrieved. In specifying the plurality of tasks, there is a case in which a pair of tasks is specified and a case in which more than one pair of tasks is specified.

A case in which a pair of tasks is specified is shown in FIG. 21, where the tasks T1 and T2 are selected at the window A. A case in which more than one pair of tasks is specified is shown in FIG. 22, where a pair of the tasks T1 and T2 and a pair of the tasks T1 and T3 are selected at the window A.

Then, the interaction controlling unit 2 sends a request for the inter-task-data retrieval to the static-specification-information editing unit 31, as indicated by "d" in FIG. 20. In response, the static-specification-information editing unit 31 sends the request to the editing-means-coordination controlling unit 4, as indicated by "e". Then, the editing-means-coordination controlling unit 4 sends the request to the data-retrieval controlling unit 6, as indicated by "f". Upon receiving the request, the data-retrieval controlling unit 6 starts the inter-task-data-retrieval process (indicated by "g") to search for inter-task data in the dynamic-specification-information file 7.

When only one pair of tasks is selected as shown in FIG. 21, retrieved information on the inter-task data is sent to the interaction controlling unit 2, as indicated by "h". As a result, a list of the inter-task data between the tasks T1 and T2 is displayed on a window B1 of FIG. 21. Then, a selection is made from the list of the inter-task data shown in the window B1, and an item "document retrieval" is selected from a menu. Then, the interaction controlling unit 2 sends a request for a document retrieval to the data-retrieval controlling unit 6, as indicated by "i". Upon receiving the request, the data-retrieval controlling unit 6 starts a document-retrieval process (indicated by "j") to search for documents relating to the selected inter-task data in the dynamic-specification-information file 7. Then, the data-retrieval controlling unit 6 sends a list of retrieved documents to the interaction controlling unit 2, as indicated by "k". As a result, the list of the documents is displayed in a window C of FIG. 21.

When more than one pair of tasks is selected as shown in FIG. 22, retrieved information on the inter-task data is sent to the interaction controlling unit 2, as indicated by "h". As a result, lists of the inter-task data between the tasks T1 and T2 and between the tasks T1 and T3 are displayed on a window B1 of FIG. 22. Then, a logical condition for the document retrieval can be specified at the window B1 when the item "document retrieval" is selected from the menu. In the example of FIG. 22, a logical condition "data B1 and (data A1 or data A2)" is specified, where the data A1 and A2 belong to the inter-task data between the tasks T1 and T2, and the data B1 belongs to the inter-task data between the tasks T1 and T3. Then, the interaction controlling unit 2 sends a request for the document retrieval with the specified logical condition to the data-retrieval controlling unit 6, as indicated by "i". Upon receiving the request, the data-retrieval controlling unit 6 starts a document-retrieval process (indicated by "j") to search for documents satisfying the specified logical condition in the dynamic-specification-information file 7. Then, the data-retrieval controlling unit 6 sends a list of retrieved documents to the interaction controlling unit 2, as indicated by "k". As a result, the list of the documents is displayed in a window C of FIG. 22.

According to the present invention, the editing means for separately expressing the dynamic specification information and the static specification information is provided in the software-design aiding device for use in the task-division process. Also, the editing of these two different types of information can be coordinated with each other. Thus, the design documents created as products of the task-division process have less variation in their expressions. As a result, discrepancies between the writers and the readers of these documents with regard to their understanding of the documents are reduced, so that the reliability of the design documents is enhanced.

Also, harmonization between the specifications is achieved, so that the reusability of program assets is enhanced.

Furthermore, in the testing process which is conducted when a malfunction is detected in the system being designed, necessary specification information (design documents) can be extracted based on the design components (event data and the like) which are described in the log information. Thus, a time length required for malfunction analysis is shortened.

Further, the present invention is not limited to these embodiments, but various variations and modifications may be made without departing from the scope of the present invention.

What is claimed is:

1. A device for aiding a software designing process as to how to divide software into a plurality of tasks, said device comprising:

dynamic-specification-information editing means for defining dynamic behaviors between said tasks to create a dynamic specification;

static-specification-information editing means for defining static configurations between said tasks to create a static specification; and editing-means coordination controlling means for coordinating operations of said dynamic-specificationinformation editing means and said static-specification-information editing means so as to reduce a variation in expressions between said dynamic specification and said static specification regarding said tasks.

2. The device as claimed in claim 1, further comprising:

a display;

input means for receiving an input from a user;

dynamic-specification-design-component storage means for storing dynamic-specification-design components used in said dynamic specification;

dynamic/static-specification-design component storage means for storing shared-specification-design components used in both said dynamic specification and said static specification; and dynamic-specification-information-format storage means for storing a format of said dynamic specification, wherein said dynamic-specification-information editing means displays on said display by using said format a first document region in which said dynamic-specification-design components and said shared-specification-design components selected through said input means are arranged to create said dynamic specification.

3. The device as claimed in claim 2, wherein said dynamic-specification-information editing means displays on said display a template region, from which said dynamic-specification-design components and said shared-specification-design components are selected through said input means so as to be arranged in said first document region.

4. The device as claimed in claim 3, wherein said dynamic-specification-design components include inter-task data exchanged between said tasks, and said shared-specification-design components include said tasks.

5. The device as claimed in claim 2, further comprising:

static-specification-design-component storage means for storing static-specification-design components used in said static specification; and static-specification-information-format storage means for storing a format of said static specification, wherein said static-specification-information editing means displays on said display by using said format of said static specification a second document region in which static-specification-design components and said shared-specification-design components selected through said input means are arranged to create said static specification.

6. The device as claimed in claim 5, further comprising interface-specification-information editing means for defining data exchanged between subsystems, wherein said editing-means-coordination controlling means activates said dynamic-specification-information editing means when an editing of said dynamic specification with regard to said data is requested through said input means during an operation of said interface-specification-information editing means.

7. The device as claimed in claim 6, further comprising initial-drawing-arrangement controlling means for extracting said shared-specification-design components from at least one of said dynamic specification and said static specification, displaying a list of said shared-specification-design components on said display, and arranging in said first document region said shared-specification-design components selected from said list through said input means, wherein said editing-means-coordination controlling means activates said initial-drawing-arrangement controlling means before activating said dynamic-specification-information editing means.

8. The device as claimed in claim 6, wherein said dynamic-specification-information editing means displays a list of said shared-specification-design components upon a request for said list, and displays in said first document region said shared-specification-design components which are selected from said list through said input means.

9. The device as claimed in claim 5, further comprising initial-drawing-arrangement controlling means for extracting said shared-specification-design components from at least one of said dynamic specification and said static specification, displaying a list of said shared-specification-design components on said display, and arranging in said first document region said shared-specification-design components selected from said list through said input means, wherein said editing-means-coordination controlling means activates said initial-drawing-arrangement controlling means before activating said dynamic-specification-information editing means when an editing of said dynamic specification is requested through said input means.

10. The device as claimed in claim 5, wherein said dynamic-specification-information editing means displays a list of said shared-specification-design components upon a request for said list, and displays in said first document region said shared-specification-design components which are selected from said list through said input means.

11. The device as claimed in claim 5, further comprising dynamic-specification storage means for storing dynamic specifications, wherein said shared-specification-design components include said tasks and said dynamic-specification-design components include inter-task data exchanged between said tasks.

12. The device as claimed in claim 11, further comprising data-retrieval controlling means for retrieving from said dynamic specifications said inter-task data which relates to at least one pair of said tasks, and displaying retrieved inter-task data on said display, wherein said editing-means-coordination controlling means activates said data-retrieval controlling means when a data retrieval is requested through said input means during an operation of said static-specification-information editing means, and and at least one pair of said tasks is selected during said operation of said static-specification-information editing means.

13. The device as claimed in claim 12, wherein when one of said inter-task data is selected from said retrieved inter-task data, said data-retrieval controlling means retrieves from said dynamic-specification storage means said dynamic specifications which include said inter-task data selected from said retrieved inter-task data, and displays retrieved dynamic specifications.

14. The device as claimed in claim 12, wherein when at least one of said inter-task data is selected from said retrieved inter-task data and a logical condition for a retrieval is determined by using said at least one of said inter-task data, said data-retrieval controlling means retrieves from said dynamic-specification storage means said dynamic specifications which satisfy said logical condition, and displays retrieved dynamic specifications.

15. The device as claimed in claim 1, further comprising:

a display;

input means for receiving an input from a user;

static-specification-design-component storage means for storing static-specification-design components used in said static specification;

dynamic/static-specification-design component storage means for storing shared-specification-design components used in both said dynamic specification and said static specification; and static-specification-information-format storage means for storing a format of said static specification, wherein said static-specification-information editing means displays on said display by using said format a document region in which said static-specification-design components and said shared-specification-design components selected through said input means are arranged to create said static specification.

16. The device as claimed in claim 15, wherein said static-specification-information editing means displays on said display a template region, from which said static-specification-design components and said shared-specification-design components are selected through said input means so as to be arranged in said document region.

17. The device as claimed in claim 16, wherein said static-specification-design components include communication mechanisms used between said tasks and shared data shared between said tasks, and said shared-specification-design components include said tasks.

* * * * *